US010732982B2

(12) United States Patent
Pennala et al.

(10) Patent No.: US 10,732,982 B2
(45) Date of Patent: Aug. 4, 2020

(54) DATA PROCESSING SYSTEMS

(71) Applicant: Arm Limited, Cambridge (GB)

(72) Inventors: Jussi Tuomas Pennala, Trondheim (NO); Robert John Rees, Cambridge (GB); Hakan Lars-Goran Persson, Bjarred (SE)

(73) Assignee: Arm Limited, Cambridge (GB)

( * ) Notice: Subject to any disclaimer, the term of this patent is extended or adjusted under 35 U.S.C. 154(b) by 180 days.

(21) Appl. No.: 16/047,336

(22) Filed: Jul. 27, 2018

(65) Prior Publication Data

US 2019/0056955 A1 Feb. 21, 2019

(30) Foreign Application Priority Data

Aug. 15, 2017 (GB) .................................. 1713091.5

(51) Int. Cl.
*G06F 9/46* (2006.01)
*G06F 9/38* (2018.01)
*G06F 9/455* (2018.01)
*G06F 9/50* (2006.01)

(52) U.S. Cl.
CPC ........ *G06F 9/3877* (2013.01); *G06F 9/45558* (2013.01); *G06F 9/5077* (2013.01); *G06F 9/5083* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| 7,598,958 | B1 | 10/2009 | Kelleher |
| 7,633,505 | B1 | 12/2009 | Kelleher |
| 7,721,118 | B1 | 5/2010 | Tamasi |
| 9,135,189 | B2 * | 9/2015 | Chakraborty ........... G06F 9/455 |
| 2003/0164834 | A1 | 9/2003 | Lefebvre |
| 2005/0041031 | A1 | 2/2005 | Diard |
| 2006/0267987 | A1 | 11/2006 | Litchmanov |
| 2008/0098208 | A1 | 4/2008 | Reid |

(Continued)

FOREIGN PATENT DOCUMENTS

GB 2527822 1/2016

OTHER PUBLICATIONS

Response to Office Action dated Jun. 11, 2019, U.S. Appl. No. 15/428,645.

(Continued)

*Primary Examiner* — Diem K Cao
(74) *Attorney, Agent, or Firm* — Vierra Magen Marcus LLP

(57) ABSTRACT

A data processing system comprises one or more data processing units, a configurable interconnect and control circuitry. The control circuitry allocates one or more of the data processing units to a virtual machine and configures the configurable interconnect so as route one or more data processing tasks from the virtual machine to the one or more data processing units allocated for use by that virtual machine. This can provide a flexible and adaptable data processing system for carrying out the data processing tasks of a virtual machine, with the particular allocation of data processing units being substantially transparent to the virtual machine.

19 Claims, 10 Drawing Sheets

(56) References Cited

U.S. PATENT DOCUMENTS

| | | | | |
|---|---|---|---|---|
| 2010/0011370 | A1* | 1/2010 | Kubo | G06F 8/60 |
| | | | | 718/104 |
| 2012/0249559 | A1 | 10/2012 | Khodorkovsky | |
| 2014/0218377 | A1 | 8/2014 | Wu | |
| 2017/0024231 | A1* | 1/2017 | Riel | G06F 9/45558 |
| 2017/0236244 | A1 | 8/2017 | Price | |
| 2018/0077214 | A1* | 3/2018 | Fawcett | G06F 9/5066 |
| 2019/0213032 | A1* | 7/2019 | Eyal | G06F 9/50 |

OTHER PUBLICATIONS

Notice of Allowance dated Jul. 9, 2019, U.S Appl. No. 15/428,645.
Office Action dated Dec. 11, 2018, U.S. Appl. No. 15/428,645.
GB Combined Search and Examination Report, dated Jul. 21, 2016, GB Patent Application No. GB1602547.0.
Response to Office Action dated Oct. 31, 2018, U.S. Appl. No. 15/428,645.
Office Action dated May 31, 2018, U.S. Appl. No. 15/428,345.

* cited by examiner

DATA PROCESSING SYSTEMS

BACKGROUND

The technology described herein relates to data (e.g. graphics) processing systems, and in particular to data processing systems that comprise one or more data processing units (e.g. graphics processing units (graphics processors or GPUs)).

Data processing units (e.g. GPUs) can be used to perform graphics and other, non-graphics, data processing tasks. It is becoming increasingly common for data processing systems to require multiple, independent data processing functions to be performed by a data processing unit (processor). For example, vehicles may have a display screen for the main instrument console, an additional navigation and/or entertainment screen, and an Advanced Driver Assistance System (ADAS). Each of these systems may require their own data processing functions to be performed and it may be necessary, e.g. for formal safety requirements, for them to be able to operate independently of each other. One approach to such systems may be to provide a single data processing unit that is time shared between the different data processing functions that are required. However, such time sharing can be complex and error prone, may suffer from poor performance, and may not be able to provide fully independent execution of the different data processing functions. Alternatively, a separate data processing unit may be provided for each data processing function that is required. However, this may have negative implications, e.g., in terms of the number of processing components and/or cost required to implement the desired functions.

The Applicants believe that there remains scope for improvements to data processing systems that comprise one or more data processing units.

BRIEF DESCRIPTION OF THE DRAWINGS

Embodiments of the technology described herein will now be described by way of example only and with reference to the accompanying drawings, in which.

Like reference numerals are used for like components where appropriate in the drawings.

DETAILED DESCRIPTION

Figure 1:
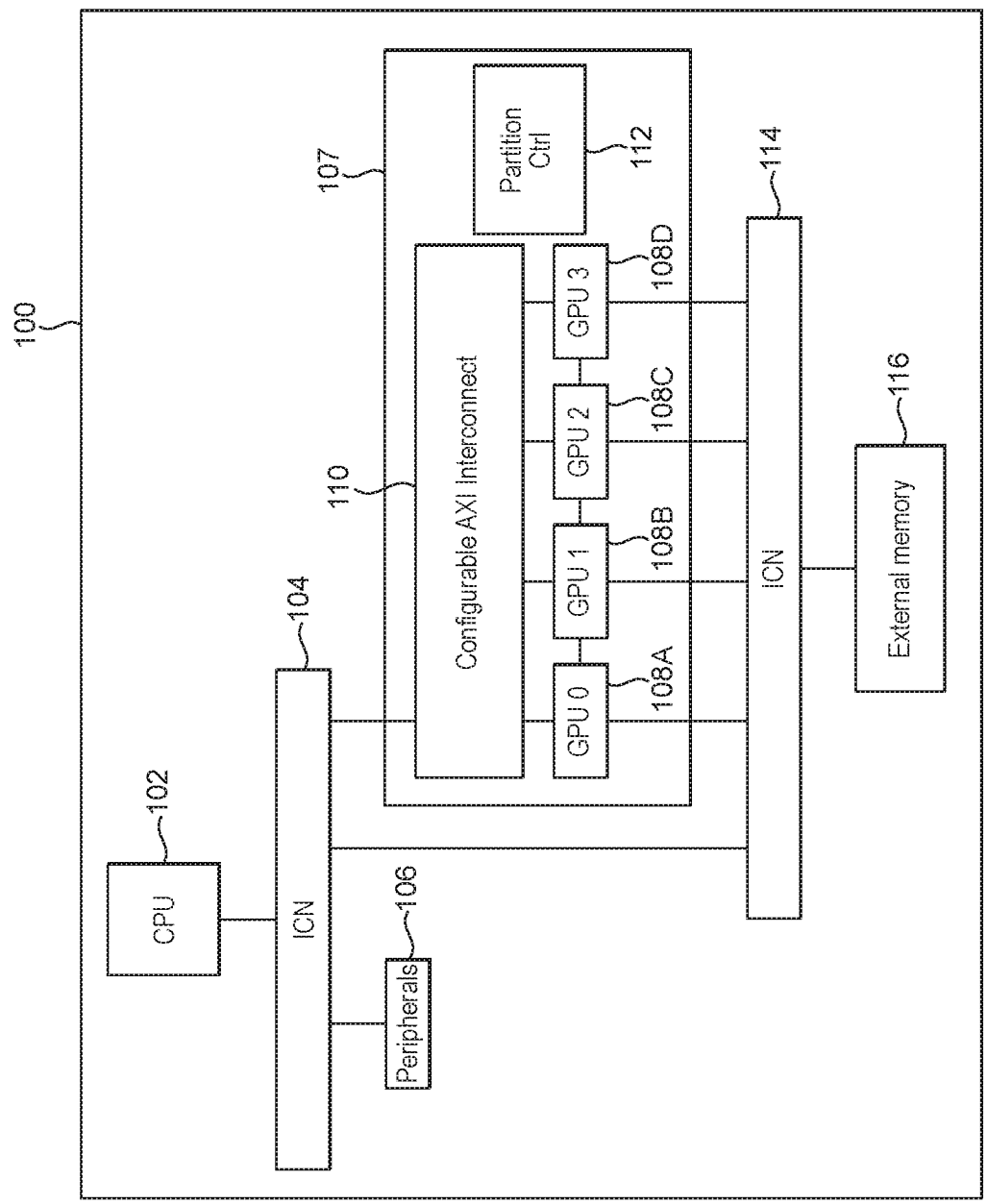
FIG. 1 shows schematically a host data processing system comprising a graphics processing system according to an embodiment of the technology described herein.

An embodiment of the technology described herein comprises a data processing system comprising:

one or more data processing units;

a configurable interconnect that is operable to route data processing tasks from virtual machines to the one or more data processing units; and control circuitry operable to allocate a set of one or more of the data processing units to a virtual machine for use by that virtual machine, wherein when allocating the set of one or more data processing units to the virtual machine, the control circuitry is operable to configure the configurable interconnect to route one or more data processing tasks from the virtual machine to the one or more data processing units allocated for use by that virtual machine.

Another embodiment of the technology described herein comprises a method of operating a data processing system, the system comprising one or more data processing units and a configurable interconnect for routing data processing tasks from virtual machines to the one or more data processing units, the method comprising:

allocating, by control circuitry of the system, a set of one or more of the data processing units to a virtual machine for use by that virtual machine, wherein allocating the set of one or more data processing units to the virtual machine comprises the control circuitry configuring the configurable interconnect to route one or more data processing tasks from the virtual machine to the one or more data processing units allocated for use by that virtual machine.

In the technology described herein, control circuitry is provided that is operable to allocate a set or "partition" of one or more data (e.g. graphics) processing units to a virtual machine that requires one or more data (e.g. graphics) processing tasks to be carried out by a data processing unit. Thus, the technology described herein can provide a graphics processing system for carrying out the data processing tasks of a virtual machine in which one or more data processing units can be allocated to that virtual machine by control circuitry, e.g. in a flexible and adaptable manner.

Furthermore, in the technology described herein, allocating one or more data processing units to a virtual machine comprises the control circuitry configuring a configurable interconnect to route one or more data processing tasks (e.g. that are each to be performed as one or more data (e.g. graphics) processing operations) from the virtual machine to the one or more data processing units allocated for use by that virtual machine. This is in contrast, for example, to the virtual machine being given the specific addresses for the one or more data processing units allocated for use by that virtual machine. Thus, in the technology described herein, a virtual machine can, e.g., use its own addresses when issuing data processing tasks to the allocated one or more data processing units. Furthermore, the virtual machine can, e.g., continue to use those addresses should the control circuitry later allocate or reallocate one or more data processing units to or from that virtual machine. Thus, in the technology described herein, the particular allocation of data processing units to a virtual machine can be substantially transparent to that virtual machine.

The technology described herein is particularly (but not necessarily) applicable to graphics processing systems. Thus, in embodiments, the data processing system may comprise (may be) a graphics processing system. Similarly, the one or more data processing units may comprise (may be) one or more graphics processing units (e.g. graphics processors).

Thus, another embodiment of the technology described herein comprises a graphics processing system comprising:
   one or more graphics processing units;
   a configurable interconnect that is operable to route data processing tasks from virtual machines to the one or more graphics processing units; and
   control circuitry operable to allocate a set of one or more of the graphics processing units to a virtual machine for use by that virtual machine, wherein when allocating the set of one or more graphics processing units to the virtual machine, the control circuitry is operable to configure the configurable interconnect to route one or more data processing tasks from the virtual machine to the one or more graphics processing units allocated for use by that virtual machine.

Similarly, another embodiment of the technology described herein comprises a method of operating a graphics processing system, the system comprising one or more graphics processing units and a configurable interconnect for routing data processing tasks from virtual machines to the one or more graphics processing units, the method comprising:
   allocating, by control circuitry of the system, a set of one or more of the graphics processing units to a virtual machine for use by that virtual machine, wherein allocating the set of one or more graphics processing units to the virtual machine comprises the control circuitry configuring the configurable interconnect to route one or more data processing tasks from the virtual machine to the one or more graphics processing units allocated for use by that virtual machine.

In these embodiments, the data processing tasks may comprise (may be) graphics processing tasks. However, this is not essential since the one or more graphics processing units may, and in embodiments do, carry out one or more other (non-graphics) data processing tasks.

In the following description, reference will primarily be made to a graphics processing system and graphics processing units. However, the technology described herein can apply equally to other forms of data processing system and/or other forms of data processing units (processors or accelerators), such as video processing units, display processing units, digital signal processing units, neural network processing units, etc. Thus, throughout the following description, the features "graphics processing system" and/or "graphics processing unit" can, and in embodiments are, replaceable with the features "data processing system" and/or "data processing unit" respectively, unless the specific context requires otherwise.

In embodiments, the virtual machine may be one virtual machine of plural virtual machines that use the graphics processing system to carry out their data processing tasks. The processes described herein that are performed in respect of a virtual machine may accordingly be performed in respect of each one of plural virtual machines. In these embodiments, the control circuitry may be operable to allocate a set or "partition" of one or more of the graphics processing units to at least one other virtual machine of the plural virtual machines for use by that at least one other virtual machine. Allocating the set of one or more graphics processing units to that at least one other virtual machine may again comprise the control circuitry configuring the configurable interconnect to route data processing tasks for that at least one other virtual machine to the one or more graphics processing units allocated to that at least one other virtual machine.

In some embodiments, one or more graphics processing units allocated to a virtual machine may be the same as one or more graphics processing units allocated to another virtual machine. Thus, one or more graphics processing units may be allocated to plural virtual machines, e.g., for a particular period of time. The plural virtual machines may time share those one or more graphics processing units (via the configurable interconnect), e.g., for that particular period of time.

However, in other embodiments, the one or more graphics processing units allocated to a virtual machine may all be different to the one or more graphics processing units allocated to another virtual machine. Thus, one or more graphics processing units may be allocated to only one virtual machine, e.g., for a particular period of time. The virtual machine may have sole use of those one or more graphics processing units (via the configurable interconnect), e.g., for that particular period of time.

In embodiments, the control circuitry and/or configurable interconnect may help to ensure that the one or more graphics processing units allocated to a virtual machine cannot be accessed by another (e.g. unstable and/or malicious) virtual machine (e.g. at a particular time and/or for a particular period of time).This may be desirable, for example, when the data processing tasks to be carried out for that virtual machine are safety and/or security critical. An example of a security critical task may be one which requires data content protection.

In embodiments, the control circuitry may allocate to a virtual machine a set of one or more graphics processing units that are not operatively connected to another set of one or more graphics processing units. As will be discussed in more detail below, the respective sets of one or more graphics processing units, and/or respective virtual machines to which respective sets of one or more graphics processing units are allocated, may belong to different "domains". The data processing tasks for a virtual machine can then be carried out by the allocated set of one or more graphics processing units substantially in isolation from another set of one or more graphics processing units. These embodiments can again provide a safer and/or more secure graphics processing system for carrying out the data processing tasks of a virtual machine.

The configurable interconnect may comprise any desired and suitable circuitry that allows that interconnect to be configured (and, e.g., reconfigured) by the control circuitry. For example, the configurable interconnect may comprise one or more switches and/or one or more sub-interconnects. An interconnect (or sub-interconnect) may comprise one or more data buses. The control circuitry may be connected to the configurable interconnect by a mapping interconnect. In embodiments, allocating a set of one or more of the graphics processing units to a virtual machine may comprise the control circuitry determining an address mapping between that virtual machine and the one or more graphics processing units allocated to that virtual machine. The address mapping may then be provided to the configurable interconnect by the control circuitry. The configurable interconnect can then implement the address mapping so as to route one or more data processing tasks from the virtual machine to the one or more allocated graphics processing units. In embodiments, configuring (and, e.g., reconfiguring) the configurable interconnect may comprise the control circuitry providing an address mapping to the configurable interconnect that maps addresses used by one or more virtual machines to graphics processing unit addresses for the one or more graphics processing units. An address may comprise any desired and suitable address that might be used by a virtual machine when issuing a data processing task to a graphics processing unit, such as a GPU base address.

In embodiments, the control circuitry may be operable to subsequently allocate a further (e.g. different) set of one or more of the graphics processing units or no graphics processing units to a virtual machine. Subsequently allocating the further set of one or more graphics processing units to the virtual machine may comprise the control circuitry configuring (e.g., reconfiguring) the configurable interconnect to route data processing tasks for that virtual machine to the one or more graphics processing units subsequently allocated to that virtual machine. Subsequently allocating no graphics processing units to a virtual machine may comprise the control circuitry configuring (e.g., reconfiguring) the configurable interconnect so as not to route data processing tasks for that virtual machine to any of the one or more graphics processing units.

Subsequently allocating a further set of one or more of the graphics processing units or no graphics processing units to a virtual machine may comprise the control circuitry suspending or ending the data processing tasks of that virtual machine prior to allocating the further set of one or more of the graphics processing units or no graphics processing units to that virtual machine. These embodiments may then comprise the control circuitry indicating to the virtual machine that the data processing tasks can be resumed once the further set of one or more graphics processing units have been allocated to that virtual machine (if there are still one or more graphics processing units allocated to that virtual machine).

The further set of one or more graphics processing units allocated to a virtual machine may comprise one or more or all of the one or more graphics processing units previously allocated to the virtual machine, but may not be precisely the same set of one or more graphics processing units. Thus, the further set of one or more graphics processing units allocated to a virtual machine may comprise a different set of one or more graphics processing units to that which was previously allocated to the virtual machine. There may, for example, be fewer or more graphics processing units in the further set of one or more graphics processing units, and/or there may be one or more different graphics processing units in the further set of one or more graphics processing units.

For example, embodiments may comprise the control circuitry de-allocating one or more or all of the graphics processing units that were allocated to a virtual machine. Thus, the set of one or more graphics processing units allocated to a virtual machine may decrease in number and/or comprise fewer or no graphics processing units. For example, in embodiments, the control circuitry may allocate fewer or no graphics processing units to a virtual machine in response to a request from another virtual machine to use the graphics processing system and/or one or more of its graphics processing units. These embodiments may then comprise the control circuitry reallocating one or more of the set of graphics processing units that were previously allocated to the virtual machine to another virtual machine. These embodiments may then comprise resuming the data processing tasks of the virtual machine using fewer graphics processing units (if there are still one or more graphics processing units allocated to that virtual machine). These embodiments may also comprise starting (or resuming) the data processing tasks of the other virtual machine using the one or more graphics processing units (re)allocated to that other virtual machine.

For another example, embodiments may comprise the control circuitry allocating one or more additional graphics processing units to a virtual machine. Thus, the set of one or more graphics processing units allocated to a virtual machine may increase in number and/or comprise more graphics processing units. For example, in embodiments, the control circuitry may allocate one or more additional graphics processing units to a virtual machine in response to another virtual machine no longer needing to use the graphics processing system and/or one or more of its graphics processing units. These embodiments may comprise the control circuitry de-allocating one or more or all of the graphics processing units that were previously allocated to that other virtual machine. These embodiments may then comprise resuming the data processing tasks of the virtual machine using the one or more graphics processing units (re)allocated to that virtual machine. These embodiments may also comprise resuming the data processing tasks of the other virtual machine using fewer graphics processing units (if there are still one or more graphics processing units allocated to that other virtual machine).

The control circuitry may be configured to allocate (and, e.g., reallocate) the one or more graphics processing units to (and, e.g., from) a virtual machine in any desired and suitable way. In embodiments, the control circuitry may be configured to allocate (and, e.g., reallocate) the one or more graphics processing units to (and, e.g., from) a virtual machine in use, e.g. after the graphics processing system is powered or booted up and/or while the graphics processing system remains powered or booted up. This can allow graphics processing units to be allocated (and, e.g., reallocated) to (and, e.g., from) a virtual machine in a flexible and adaptable manner, e.g. without needing to power down or re-boot the graphics processing system.

As discussed above, allocating (and, e.g., reallocating) the one or more graphics processing units to (and, e.g., from) a virtual machine may comprise the control circuitry suspending the data processing tasks of that virtual machine. In these embodiments, when suspending the data processing tasks of a virtual machine, the control circuitry may be operable to perform a handshaking process between the control circuitry and the virtual machine. The handshaking process may comprise the control circuitry providing the virtual machine with an initial message (e.g. a value). The handshaking process may then comprise the virtual machine providing a response message (e.g. the value or a value derived therefrom) back the control circuitry. In embodiments, a virtual machine may allow suspension of its data processing tasks to take place in response to a request from the control circuitry, for example by providing a suitable response message. Alternatively, in embodiments, a virtual machine may deny or delay suspension of its data processing tasks taking place in response to a request from the control circuitry, for example by not providing a suitable response message. The handshaking process may also or instead comprise the virtual machine providing the control circuitry with an initial message (e.g. a value). The handshaking process may then comprise the control circuitry providing a response message (e.g. the value or a value derived therefrom) back the virtual machine. In embodiments, when starting or resuming the data processing tasks of a virtual machine, the control circuitry may be configured to perform a similar handshaking process between the control circuitry and that virtual machine.

The control circuitry may take any desired and suitable form. In embodiments, the control circuitry may form part of a microcontroller. Thus, the graphics processing system may comprise a microcontroller that includes the control circuitry. The control circuitry may also or instead comprise one or more state machines and/or registers.

In embodiments, the control circuitry may comprise a set of communication registers for communication between the control circuitry and a virtual machine (and, e.g., each virtual machine). Similarly, a virtual machine (and, e.g., each virtual machine) may also or instead be provided with access to a set of communication registers for communication between that virtual machine and the control circuitry. The handshaking process referred to above may take place using these sets of registers (and, e.g., interrupts). For example, an initial message (e.g. a value) may be written by the control circuitry into a communication register for the control circuitry that corresponds to a particular virtual machine. A response message (e.g. a value or a value derived therefrom) may then be written by that particular virtual machine into a communication register accessible by that particular virtual machine. Similarly, an initial message (e.g. a value) may also or instead be written by a particular virtual machine into a communication register accessible by that particular virtual machine. A response message (e.g. a value or a value derived therefrom) may then be written by the control circuitry into a communication register for the control circuitry that corresponds to that particular virtual machine. The communication registers (and, e.g., interrupts) can, for example, allow substantially the same straightforward communication processes to take place regardless of the underlying system configuration and/or allow a virtual machine to allow, deny and/or delay a re-allocation of its one or more graphics processing units.

In embodiments, the control circuitry may also comprise a set of configuration registers for configuring and/or controlling the operation of the control circuitry in the desired manner. The control circuitry may be configured and/or controlled by a hypervisor or other system controller (e.g. control unit) for the one or more virtual machines. The configuration registers may be accessible separately from the communication registers referred to above. This may help to prevent the virtual machines configuring or controlling the operation of the control circuitry.

In some embodiments, (e.g. initially) a virtual machine may not have one or more of the graphics processing units allocated to it and/or (e.g. initially) one or more of the graphics processing units to be allocated to a virtual machine may not yet be available for use. In these embodiments, the control circuitry may be operable to (e.g. initially) provide a virtual machine that does not (e.g. yet) have one or more of the graphics processing units allocated to it with access to one or more "dummy" registers for one or more (or all) of the graphics processing units of the graphics processing system. The one or more dummy registers may be connected to the configurable interconnect and the control circuitry may configure the configurable interconnect to allow the virtual machine to access the one or more dummy registers. The one or more dummy registers may contain information relating to the one or more graphics processing units that enables at least some (e.g. driver) initialisation to take place for the virtual machine, e.g. even before one or more graphics processing units are allocated to the virtual machine and/or become available for use. In these embodiments, the driver may then enter a disabled state until the one or more graphics processing units are allocated to the virtual machine and/or become available for use. Then, when the one or more graphics processing units are allocated to the virtual machine and/or become available for use, the control circuitry may provide the virtual machine with access to one or more management unit (e.g. job manager) registers for those graphics processing units via the configurable interconnect.

The graphics processing system may comprise any desired and suitable number of graphics processing units, e.g. a single graphics processing unit or plural graphics processing units. In an embodiment, there are four graphics processing units, but the graphics processing system may comprise more or fewer graphics processing units.

The one or more graphics processing units of the graphics processing system can comprise any suitable and desired form of graphics processing units. In embodiments, a graphics processing unit (and, e.g., each graphics processing unit where there are plural graphics processing units) may be operable to act as a standalone graphics processing unit.

In embodiments in which there are plural graphics processing units, each graphics processing unit of the plurality of graphics processing units may be (e.g. selectively) connectable to at least one other graphics processing unit of the plurality of graphics processing units via a communications bridge that can allow communication between the connected or "linked" graphics processing units. In embodiments in which there are plural graphics processing units, the control circuitry may allocate a relatively greater number of (e.g. connected or "linked") graphics processing units to a virtual machine, if desired. The one or more data processing tasks for that virtual machine can then be carried out with improved performance (e.g. at a relatively higher speed and/or resolution). Alternatively, in these embodiments, the control circuitry may allocate a single graphics processing unit, or a relatively lesser number of (e.g. connected or "linked") graphics processing units, to a virtual machine. This may be desirable, for example, where lower power consumption is sought after, where improved performance is not necessary, and/or where another set of one or more of the graphics processing units have already been allocated by the control circuitry to one or more other virtual machines. These embodiments can accordingly provide a highly flexible and adaptable graphics processing system for carrying out the data processing tasks of a virtual machine.

In embodiments, at least one of the graphics processing units may also or instead be operable to act as a master graphics processing unit to control the data processing operations on another one or ones of the graphics processing units. Similarly, at least one of the graphics processing units may also or instead be operable to act as a slave graphics processing unit to perform data processing operations under the control of a master graphics processing unit of the graphics processing units. Embodiments may therefore comprise a graphics processing system that includes plural graphics processing units that can each be operated independently, as standalone graphics processing units, but with the graphics processing units also being able to be operated in a combined or "linked" manner with at least one of the graphics processing units (that thereby act as "master" graphics processing unit) controlling operations of other ones of the graphics processing units (that thereby act as "slave" graphics processing units).

The one or more graphics processing units of the graphics processing system may each comprise any or all of the normal components, functional units, and elements, etc., that a graphics processing unit may comprise. In an embodiment, where there are plural graphics processing units, each graphics processing unit may have the same set of functional units, etc., although this is not essential.

In an embodiment, a graphics processing unit (and e.g. each graphics processing unit) of the one or more graphics processing units includes one or more execution units, such as one or more shader (programmable processing) cores. In an embodiment, the one or more graphics processing units (and thus the graphics processing system) are tile-based graphics processing units. Where the one or more graphics processing units are tile-based graphics processing units, then each graphics processing unit may also include a tiling unit (a tiler or hierarchical tiler). Where there are plural graphics processing units, different graphics processing units may have different sets of one or more execution units, and they may have one or more other execution units in addition to one or more shader cores and one or more tiling units. In an embodiment, a (and e.g. each) graphics processing unit includes a plurality of shader cores, such as four shader cores (programmable processing (shader) cores).

A graphics processing unit (and e.g. each graphics processing unit) of the one or more graphics processing units may also comprise a management unit (a job manager) that provides the virtual machine (software) interface for the graphics processing unit and is also operable to divide a data processing task allocated to the graphics processing unit into subtasks and to distribute the subtasks for execution to the execution unit or units of the graphics processing unit.

A graphics processing unit (and e.g. each graphics processing unit) of the one or more graphics processing units may also comprise a cache (and e.g. a level 2 cache) that provides the interface to an external (main) system memory of an overall host data processing system that the graphics processing system may be part of. This cache can be arranged in any suitable and desired manner.

A graphics processing unit (and e.g. each graphics processing unit) of the one or more graphics processing units may also include a memory management unit (MMU). However, appropriate memory management units could also or instead be located externally to the graphics processing unit or units, if desired.

A graphics processing unit (and e.g. each graphics processing unit) of the one or more graphics processing units may also comprise an appropriate communications network for providing communications between the various units of the graphics processing unit, such as memory transactions between execution units and/or the cache of the graphics processing unit, subtask control traffic between the job manager and execution units and so on. As will be discussed further below, the routing of the communications network may be reconfigured in use, depending upon the allocation and/or operation mode (standalone, master, or slave) of the graphics processing unit. This may be done by (e.g. the control circuitry) appropriately configuring one or more switches in the communications network.

As discussed above, where there are plural graphics processing units, each graphics processing unit may include a communications bridge for connecting the graphics processing unit to another one of the graphics processing units of the plurality of graphics processing units. Each graphics processing unit may be connected via a bridge to only one other graphics processing unit, or may be connected to plural other graphics processing units, e.g. depending upon the configuration and layout of the graphics processing units and how many graphics processing units there are in the graphics processing system.

In an embodiment, there is a separate bridge for each other graphics processing unit that the graphics processing unit in question is connected to. Thus, for example, where a graphics processing unit is connected to two other graphics processing units of the plurality of graphics processing units, then that graphics processing unit will have two communications bridges, with each communications bridge connecting the graphics processing unit to a respective other graphics processing unit of the plurality of graphics processing units.

In an embodiment, each graphics processing unit may be connected either to one or to two other graphics processing units. In the case where there are only two graphics processing units in the plurality of graphics processing units, then each graphics processing unit may be connected to one other graphics processing unit. Where there are more than two graphics processing units in the plurality of graphics processing units, then some of the graphics processing units (the "end" graphics processing units) in the plurality of graphics processing units may be connected to one other graphics processing unit, and others of the graphics processing units (the "middle" graphics processing units) may be connected to two other graphics processing units of the plurality of graphics processing units. Thus, a graphics processing unit may be connected to a maximum of two other graphics processing units (and accordingly may have two but no more than two connection bridges).

Other arrangements are possible in other embodiments. For example, the graphics processing units may be connected in a "star" arrangement, "daisy chain" arrangement, or via a packet based interconnect.

Each communications bridge may allow direct communication between the two graphics processing units that the bridge connects. The respective bridges of the graphics processing units may be configurable (e.g. by the control circuitry) in use to either be operatively connected or not operatively connected with another graphics processing unit, to thereby allow or prevent communication with that other graphics processing unit via the bridge. This can be achieved in any desired and suitable manner. In an embodiment, the graphics processing units include one or more switches (e.g. the one or more switches of the communications network discussed above) that can be set to allow or prevent communication via the communications bridge.

In embodiments, the control circuitry may be configured to enable communication between at least two of the graphics processing units of the plurality of graphics processing units via the communications bridge or bridges of the graphics processing units to allow communication between the at least two graphics processing units. Similarly, the control circuitry may be configured to disable communication between at least two of the graphics processing units of the plurality of graphics processing units via a communications bridge or bridges of the graphics processing units to prevent communication between the at least two graphics processing units.

The bridges connecting the graphics processing units may provide and support an asynchronous interface between the graphics processing units. This facilitates physical implementation of the graphics processing units, as the clocks for connected graphics processing unit may then be independent even when the graphics processing units are communicating via their bridges.

In an embodiment, where a graphics processing unit has two connection bridges, then the connection bridges may be aligned in the layout of the graphics processing unit, so that that graphics processing unit can straightforwardly be instantiated multiple times in an integrated circuit. This will then facilitate more straightforward development and/or implementation of the graphics processing system, as it would be possible to form the graphics processing system of linked graphics processing units simply by instantiating such a "standard" graphics processing unit design multiple times in an integrated circuit.

As discussed above, a graphics processing unit (and e.g. each graphics processing unit) of the one or more graphics processing units may be capable of operating in a "standalone" mode. In an embodiment, where there are plural graphics processing units, all of the graphics processing units may be capable of operating in a standalone mode. In this mode, the graphics processing unit will operate on its own (not in combination with any of the other graphics processing units) to carry out a desired data (e.g. graphics) processing task (operation), such as providing an output frame(s) for display, and may operate independently of the other graphics processing units, e.g. under direct control from a virtual machine (and e.g. under the control of an appropriate driver for the graphics processing system that is executing on a host data processing unit (e.g. central processing unit) of an overall host data processing system that the graphics processing system may be part of). In these embodiments, the control circuitry may be configured to disable communication via a communications bridge or bridges between one or more graphics processing units and the other graphics processing unit or units to which they are connectable via their communication bridges.

When operating in standalone mode, a graphics processing unit may not have any internal dependencies on any of the other graphics processing units. Thus, each graphics processing unit may have a separate clock and/or reset, so that there should be no internal dependencies on any of the other graphics processing units of the plurality of graphics processing units when operating in the standalone mode. In this mode of operation, a job manager unit that provides the software interface for the graphics processing unit in question may divide the data processing task of the graphics processing unit into subtasks and distribute the subtasks for execution to the various execution units of that graphics processing unit.

As discussed above, at least one graphics processing unit (and e.g. each graphics processing unit) of the plurality of graphics processing units may also be capable of operating in at least one of a master mode and a slave mode. A graphics processing unit may be "hard wired" to be operable only as a master graphics processing unit or a slave graphics processing unit (in addition to being operable as a standalone graphics processing unit), or it may be configured to be capable of operating both as a master graphics processing unit and as a slave graphics processing unit (in addition to as a standalone graphics processing unit), with the master or slave operation then being able to be set in use, e.g. by appropriate configuration of the graphics processing unit by the control circuitry.

Thus, a graphics processing unit may be operable in two different modes only (e.g. standalone mode or master mode, or in standalone mode or slave mode), or may be able to be operated in each of the three modes (i.e. the standalone mode, master mode or slave mode), e.g. depending upon the layout of the graphics processing units and how many graphics processing units there are in the graphics processing system.

In the master mode operation, the graphics processing unit may operate to control one or more other graphics processing units operating in slave mode, and in the slave mode the graphics processing unit may operate under the control of another one of the plurality of graphics processing units that is acting as a master graphics processing unit.

A graphics processing unit can be configured to operate in the desired mode in any suitable and desired manner. In an embodiment, this is achieved by appropriately setting the communications network of the graphics processing unit to allow communication relevant to the operating mode in question (and to prevent communication that would be inappropriate for the operating mode in question and/or appropriate for another operating mode). Thus, for example, where the graphics processing unit is to act in standalone mode, the communication to other graphics processing units via the communications bridge or bridges of the graphics processing unit may be disabled (prevented). Correspondingly, where the graphics processing unit is to act as a master or slave graphics processing unit, then the communications network between the communication bridges of the graphics processing unit and its corresponding slave or master graphics processing units may be configured accordingly. This may be done by setting one or more switches controlling the communications network and/or communication bridges to other graphics processing units of the plurality of graphics processing units appropriately.

As discussed above, the control circuitry may be operable to configure the operation of a (and e.g. each) graphics processing unit. This may take place using a configuration interface between the control circuitry and a (and e.g. each) graphics processing unit. The desired configuration can be set (configured) in any suitable and desired manner. In an embodiment, this can only be reconfigured by the control circuitry (i.e. such that any virtual machine controlling the graphics processing unit to perform data processing tasks cannot itself operate to set the configuration of the graphics processing unit). This may be beneficial for safety and/or security purposes.

The communications network configuration may be performed by setting that control configuration via external register interfaces to the graphics processing units. In an embodiment, the configuration of the bridges is set in a separate register block to the standard job manager (management unit) registers of the graphics processing unit. This would then allow the control circuitry to provide access to the management unit (job manager) registers of the graphics processing unit to a virtual machine without allowing the virtual machine to reconfigure the communication bridges and/or the communications network routing.

When a graphics processing unit is operating in the master mode of operation, it may control at least one other graphics processing unit of the plurality of graphics processing units operating in slave mode. The master graphics processing unit may provide the software interface for itself and its set of one or more slave graphics processing units. This then has the advantage that to any virtual machine that is using the graphics processing system, it still appears as though there is only a single graphics processing unit.

When a graphics processing unit is operating as a master graphics processing unit, it may be directly connected to at least one slave graphics processing unit of the plurality of graphics processing units via the appropriate communications bridge. It may also control further slave graphics processing units of the plurality of graphics processing units. In some embodiments, the master graphics processing unit may have a direct connection with each of the plural slave graphics processing units via appropriate communications bridges, but in other embodiments a master graphics processing unit may control and/or communicate with plural slave graphics processing units via respective other slave graphics processing units (such that the master graphics processing unit may control and/or communicate with one or more slave graphics processing units via a "daisy-chain" of other slave graphics processing units).

A graphics processing unit operating in the master mode may control only a single slave graphics processing unit, or may control plural slave graphics processing units (e.g. depending upon how many graphics processing units are present in the graphics processing system and how the graphics processing units are configured to operate). Where the graphics processing system includes three or more graphics processing units, then the graphics processing unit operating in master mode may control plural other graphics processing units of a set of graphics processing units (and, if desired, all of the other graphics processing units of the set of graphics processing units).

It will be appreciated that when one of the graphics processing units is acting as a master graphics processing unit, there will correspondingly be one or more other graphics processing units of the plurality of graphics processing units that are in communication with that master graphics processing unit and acting as slave graphics processing units under the control of that master graphics processing unit. Thus, there will, in effect, be a linked set of graphics processing units comprising one graphics processing unit acting as a master graphics processing unit for the linked set of graphics processing units and one or more other graphics processing units acting as slave graphics processing units in the linked set of graphics processing units. The linked set of graphics processing units may comprise two or more graphics processing units of the plurality of graphics processing units. It may comprise all of the graphics processing units of the plurality of graphics processing units that the graphics processing system comprises, or only a subset of that plurality of graphics processing units. In an embodiment, a given linked set of graphics processing units comprises two graphics processing units (i.e. one master and one slave graphics processing unit), three graphics processing units (i.e. one master and two slave graphics processing units), or four graphics processing units (i.e. one master and three slave graphics processing units).

When operating in the slave mode, a graphics processing unit will operate under the control of another graphics processing unit of the plurality of graphics processing units that is acting as a master graphics processing unit. In this case, the slave graphics processing unit may communicate with its respective master graphics processing unit directly where the master graphics processing is directly connected via a communications bridge to the slave graphics processing unit (e.g. in a "star" type arrangement), or it may communicate with the master graphics processing unit via one or more other (slave) graphics processing units (e.g. in a "daisy-chain" type arrangement), or combinations thereof, as desired. Other arrangements are possible in other embodiments. For example, the slave graphics processing unit may communicate with its respective master graphics processing unit via a packet based interconnect, e.g. with the interconnect and/or graphics processing units having a grid or (two dimensional) array topology.

When a graphics processing unit is operating in standalone mode (i.e. operating independently of the other graphics processing units of the plurality of graphics processing units), then the graphics processing unit may operate in the normal manner for the type of graphics processing unit in question. Thus, for example, the job manager of the graphics processing unit may receive data processing tasks, e.g. from (e.g. a driver operating on behalf of) a virtual machine executing on a host data processing unit (e.g. central processing unit) of the overall host data processing system that the graphics processing system is part of, and then divide that task into subtasks and distribute the subtasks for execution to the various execution units of the graphics processing unit.

When a graphics processing unit of the plurality of graphics processing units is to operate in either master mode or slave mode, then the operation of the graphics processing unit can be, and may be, modified from its operation when operating in standalone mode, e.g. to take account of the fact that the graphics processing unit is acting as a master or as a slave, respectively.

As discussed above, in an embodiment, when a graphics processing unit is operating in master mode (as a master graphics processor controlling other graphics processing units of the plurality of graphics processing units operating in slave mode), the master graphics processing unit in effect acts as and provides the software interface for the set of graphics processing units that it is acting as a master graphics processing unit for (i.e. for the linked set of graphics processing units comprising the master graphics processing unit and its associated slave graphics processing units).

Thus, in an embodiment, when a graphics processing unit is acting as a master graphics processing unit, the job manager for that master graphics processing unit provides the software interface for the linked set of master and its respective slave graphics processing units, and so all communication between the, e.g. driver, on the host data processor that allocates data processing tasks to the linked set of graphics processing units may take place via the job manager of the master graphics processing unit (e.g. there may be no direct communication between the, e.g. driver, on the host data processor and the slave graphics processing units of the linked set of graphics processing units).

Correspondingly, in an embodiment, the master graphics processing unit, (e.g. the job manager of the master graphics processing unit) may be operable to divide any data processing task allocated to the linked set of graphics processing units into subtasks and to distribute those subtasks for execution to one or more execution units not only of the master graphics processing unit but also to one or more execution units of one or more (e.g. plural or all of the) slave graphics processing units that are linked to the master graphics processing unit. This then allows the master graphics processing unit to, in effect, distribute data processing task processing across the slave graphics processing units that it is controlling, but the arrangement is such that from the software side, there is still only a single graphics processing unit that is being instructed and to which the data processing task is being sent.

When a graphics processing unit is operating in slave mode (as a slave graphics processing unit under the control of another master graphics processing unit), then the operation of the graphics processing unit may be configured accordingly. Thus, for example, in an embodiment, the job manager of a graphics processing unit may be disabled when the graphics processing unit is operating in slave mode (since, as discussed above, when a graphics processing unit is operating in slave mode and linked to another "master" graphics processing unit, the master graphics processing unit will provide the software interface and distribute graphics processing "subtasks" for execution to the execution units of the slave graphics processing unit).

Correspondingly, in an embodiment, when a graphics processing unit is acting as a slave graphics processing unit, then any functional units that are not required on the slave graphics processing unit, such as a tiler unit and/or a memory management unit of the slave graphics processing unit, may be configured to be inactive. Thus any functional units that are redundant in a slave graphics processing unit may be made inactive when the graphics processing unit is configured to operate in its "slave" mode. There may be multiple slave modes depending where the graphics processing unit is located in the overall topology of the plurality of graphics processing units, e.g. when multiple graphics processing units are slaved to one master.

As discussed above, in embodiments, the control circuitry may be operable to (e.g. logically) separate plural graphics processing units into plural (e.g. two) domains, wherein each domain comprises one or more of the graphics processing units. The plural domains may be distinct domains, i.e. each graphics processing unit may belong to only one domain. Similarly, the control circuitry may be operable to (e.g. logically) separate plural virtual machines into plural (e.g. two) domains, wherein each domain comprises one or more of the virtual machines. The plural domains may be distinct domains, i.e. each virtual machine may belong to only one domain. In embodiments, the control circuitry may be configured to allocate graphics processing units from only a single domain to a virtual machine and/or may be configured not to allocate graphics processing units from plural different domains to a virtual machine. Similarly, in embodiments, the control circuitry may be configured to allocate a graphics processing unit to virtual machines from only a single domain and/or may be configured not to allocate a graphics processing unit to virtual machines from different domains.

For example, the plural domains may comprise a first domain comprising a first group of one or more of the graphics processing units and/or one or more virtual machines and a second domain comprising a second group of one or more of the graphics processing units and/or one or more virtual machines. The first domain may be reserved for and used by a first set of one or more virtual machines that require a first type of data processing task to be carried out. The second domain may be reserved for and used by a second set of one or more virtual machines that require a second type of data processing task to be carried out. The first type of data processing tasks may not comprise safety and/or security critical data processing tasks (such as graphics processing tasks for navigation/entertainment displays, etc.). The second type of data processing tasks may comprise safety and/or security critical data processing tasks (such as graphics processing tasks for main instrument console displays, data processing tasks for (e.g. assisting) vehicle control, etc.).

In embodiments, the plurality of graphics processing units may not be completely physically separated ("hard-wired") into the plural domains. This can allow the domains to be reconfigured by the control circuitry if desired. However, even in these embodiments, the plural domains may not be reconfigurable by the control circuitry (e.g. graphics processing units and/or virtual machines may not be moved from one domain to another domain) in use, e.g. after the system is powered or booted up and/or while the system remains powered or booted up. In these embodiments, the plurality of graphics processing units may be separated by the control circuitry into plural domains prior to and/or as the system is being initialised, e.g. prior to and/or as the system is being powered or booted up. However, in these embodiments, the control circuitry may still be configured to allocate (and, e.g., reallocate) one or more graphics processing units that are within a single domain to (and e.g. from) a virtual machine in use. This can allow graphics processing units to be allocated (and, e.g., reallocated) to (and e.g. from) a virtual machine in use, whilst still maintaining (e.g. logical) separation of the domains.

In embodiments, the control circuitry may be configured to reset one or more (e.g. all) of the graphics processing units. In embodiments, any configurable interconnect reconfiguration affecting a graphics processing unit and/or any communications network reconfiguration for a graphics processing unit may only be able to happen, and only happen, during reset of that graphics processing unit. The one or more graphics processing units may be reset, for example, when those one or more graphics processing units are being allocated (or reallocated) to a virtual machine (e.g. while the virtual machine is suspended). The one or more graphics processing units may also or instead be reset, for example, when the one or more virtual machines and/or graphics processing units hang or crash. In embodiments, resetting the one or more graphics processing units may comprise disabling the clocks for the one or more graphics processing units prior to asserting the reset. In these embodiments, resetting the one or more graphics processing units may comprise subsequently de-asserting the reset prior to re-enabling the clocks for the one or more graphics processing units.

In embodiments, the control circuitry may be configured to reset one or more of the graphics processing units independently of one or more others of the graphics processing units. For example, one or more of the graphics processing units may be reset without interrupting or disturbing the data processing operations being performed by one or more others of the graphics processing units. In these embodiments, respective groups (e.g. domains) of one or more of the graphics processing units may be provided with separate clocks. Similarly, in embodiments, the control circuitry may be configured to reset the one or more graphics processing units of a domain independently of the one or more graphics processing units of another domain. For example, the one or more graphics processing units of a particular domain may be reset without interrupting or disturbing the data processing operations being performed by the one or more graphics processing units of another domain. In these embodiments, the domains of graphics processing units may be provided with separate clocks.

In embodiments, the configurable interconnect may comprise a sub-interconnect for each domain. For example, the configurable interconnect may comprise a first sub-interconnect for a first domain and a second sub-interconnect for a second domain. The respective sub-interconnects can help to prevent the data processing tasks of a first domain interfering with and/or blocking the data processing tasks of a second domain when tasks are being routed via the configurable interconnect. The configurable interconnect may further comprise a switch for each graphics processing unit that selectively switches that graphics processing unit between sub-interconnects. For example, the configurable interconnect may comprise a switch for each graphics processing unit that selectively switches that graphics processing unit from receiving data from the first sub-interconnect to receiving data from the second sub-interconnect (and/or vice versa). In these embodiments, the control circuitry may be configured to reconfigure the sub-interconnect for a particular domain, e.g. independently of the sub-interconnect for another domain, for example when allocating (and e.g. reallocating) the one or more graphics processing units of that domain. This can allow allocation (and e.g. reallocation) of one or more graphics processing units to one or more virtual machines within a domain, but without affecting the operation of one or more graphics processing units and/or one or more virtual machines within another domain.

A virtual machine may take any desired and suitable form. For example, a virtual machine may execute one or more applications and/or may itself be implemented by an application. The one or more virtual machines (and e.g. applications) may run on any desired and suitable host data processing circuitry, such as one or more host data processing units (e.g. central processing units) of an overall host data processing system that may comprise the graphics processing system. In some embodiments, the one or more virtual machines may run on the same host data processing unit. In other embodiments, a separate host data processing unit may be provided for each one of plural domains. This may be beneficial for safety and/or security purposes. For example, a first set of one or more virtual machines (e.g. of a first domain) may run on a first host data processing unit and a second set of one or more one or more virtual machines (e.g. of a second domain) may run on a second host data processing unit.

In embodiments, the one or more virtual machines (host data processing circuitry) may be connected to the configurable interconnect by a system interconnect. In some embodiments, the one or more virtual machines (host data processing circuitry) may be connected to the configurable interconnect by the same system interconnect. In other embodiments, a separate system interconnect may be provided for each one of plural domains. Again, this may be beneficial for safety and/or security purposes. For example, a first set of one or more virtual machines (e.g. host data processing circuitry of a first domain) may be connected to the configurable interconnect by a first system interconnect and a second set of one or more virtual machines (e.g. host data processing circuitry of a second domain) may be connected to the configurable interconnect by a second system interconnect. The first set of one or more virtual machines (e.g. host data processing circuitry of the first domain) may not be connected to the second system interconnect and the second set of one or more virtual machines (e.g. host data processing circuitry of the second domain) may not be connected to the first system interconnect.

In embodiments, the one or more virtual machines (host data processing circuitry) may have access (e.g. via a system interconnect) to one or more peripheral devices, such as one or more output devices (e.g. display screens, vehicle controllers, etc.) and/or one or more input devices (e.g. human-computer interfaces, vehicle sensors, etc.). In some embodiments, the one or more virtual machines (host data processing circuitry) may have access to the same set of one or more peripheral devices. In other embodiments, a separate set of peripheral devices may be provided for each one of plural domains. Again, this may be beneficial for safety and/or security purposes. For example, a first set of one or more virtual machines (e.g. host data processing circuitry of a first domain) may have access to a first set of one or more peripheral devices and a second set of one or more virtual machines (e.g. host data processing circuitry of a second domain) may have access to a second set of one or more peripheral devices. The first set of one or more virtual machines (e.g. host data processing circuitry of the first domain) may not have access to the second set of one or more peripheral devices and the second set of one or more virtual machines (e.g. host data processing circuitry of the second domain) may not have access to the first set of one or more peripheral devices.

In embodiments, the one or more graphics processing units may be connected to external system memory of an overall host data processing system for storing the data used by the one or more graphics processing units when carrying out the data processing tasks and/or for storing the data generated by the one or more graphics processing units as a result of carrying out the data processing tasks. In some embodiments, where there are plural graphics processing units, the graphics processing units may be connected to the same system memory. In other embodiments, a separate system memory may be provided for each one of plural domains. Again, this may be beneficial for safety and/or security purposes. For example, a first set of one or more graphics processing units (e.g. of a first domain) may be connected to a first system memory and a second set of one or more graphics processing units (e.g. of a second domain) may be connected to a second system memory. The first set of one or more graphics processing units (e.g. of the first domain) may not be connected to the second system memory and the second set of one or more graphics processing units (e.g. of the second domain) may not be connected to the first system memory.

In embodiments, the one or more graphics processing units may be connected to the external system memory via a memory interconnect. In some embodiments, where there are plural graphics processing units, the graphics processing units may be connected to the external system memory by the same memory interconnect. In other embodiments, a separate memory interconnect may be provided for each one of plural domains. Again, this may be beneficial for safety and/or security purposes. For example, a first set of one or more graphics processing units (e.g. of a first domain) may be connected to the external system memory by a first memory interconnect and a second set of one or more graphics processing units (e.g. of a second domain) may be connected to the external system memory by a second memory interconnect. The first set of one or more graphics processing units (e.g. of the first domain) may not be connected to the second memory interconnect and the second set of one or more graphics processing units (e.g. of the second domain) may not be connected to the first memory interconnect.

In embodiments, a memory interconnect may be connected to a (corresponding) system interconnect. For example, the first memory interconnect may be connected to the first system interconnect and the second memory interconnect may be connected to the second system interconnect discussed above. The first memory interconnect may not be connected to the second system interconnect and the second memory interconnect may not be connected to the first system interconnect discussed above. Again, this may be beneficial for safety and/or security purposes.

As discussed above, in embodiments, a virtual machine may use the one or more graphics processing units allocated to that virtual machine to carry out data processing tasks to generate a desired output for that virtual machine. In these embodiments, the configurable interconnect may route the data processing tasks issued by the virtual machine to the one or more graphics processing units allocated to that virtual machine. The set of one or more of the graphics processing units allocated to that virtual machine may then perform the data processing operations for those tasks to generate the desired output.

As will be discussed in more detail below, the graphics processing units may be configured to generate any desired and suitable output data. In embodiments, at least one graphics processing unit (and e.g. each graphics processing unit) may be configured to use an (e.g. virtual machine and/or domain) identifier, e.g. provide the identifier together with output data generated by that graphics processing unit, to indicate the output data generated by that graphics processing unit. The identifier may then be stored in external system memory together with (e.g. in a header field for) the output data output from that graphics processing unit. A virtual machine may also or instead use the identifier to identify output data generated by the one or more graphics processing units allocated to that virtual machine (e.g. by matching the relevant identifier with an identifier stored together with a set of data stored in memory). The graphics processing unit may also or instead use the identifier to identify input data (e.g. previously outputted data) to be used by that graphics processing unit for its data processing operations (e.g. by matching the relevant identifier with an identifier stored together with a set of data stored in memory). Thus, the identifier can, for example, allow a virtual machine to locate and access the output data generated by the one or more graphics processing units allocated to that virtual machine and/or allow a graphics processing unit to access the input data that should be used by that graphics processing unit (e.g. for a particular virtual machine and/or domain). This can in turn help to support memory isolation between virtual machines and/or domains. Again, this may be beneficial for safety and/or security purposes. The control circuitry may be configured to provide a graphics processing unit (and e.g. each graphics processing unit) with the identifier for that graphics processing unit to use, e.g. via a configuration interface. The control circuitry may also or instead be configured to provide a virtual machine (and e.g. each virtual machine) with the identifier for that virtual machine to use.

As discussed above, the graphics processing system may be part of an overall host data processing system that includes the graphics processing system and one or more host data processing units (e.g. central processing units). The one or more host data processing units may run the one or more virtual machines that require data processing tasks to be carried out as data processing operations by the graphics processing system, and may execute one or more drivers (for the graphics processing system/units) that are operable to interface between the one or more virtual machines executing on the one or more host data processing units and the graphics processing system, e.g. to communicate data processing tasks appropriately from the one or more host data processing units to the graphics processing system.

Thus, the overall host data processing system that the graphics processing system is part of may comprise one or more host data processing units that run one or more virtual machines that can require data processing operations to be performed by a graphics processing unit. The one or more host data processing units may be operable to send appropriate commands and data to the graphics processing system to control it to carry out data processing tasks and to produce data processing outputs required by one or more virtual machines running on the one or more host data processing units.

Thus, in an embodiment, the graphics processing system is in communication with one or more host data processing units (that are part of an overall host data processing system) that execute a driver or drivers for the graphics processing system/units. The graphics processing system and/or one or more host data processing units may also be in communication with one or more displays for displaying images generated by the graphics processing system (thus in an embodiment the overall host data processing system further comprises one or more displays for displaying the images generated by the graphics processing system). The technology described herein accordingly also extends to the overall host data processing system that the graphics processing system may be part of.

As will be appreciated by those skilled in the art, as well as the elements and stages described above, a graphics processing unit (and e.g. each graphics processing unit) of the one or more graphics processing units may otherwise include any one or more of the other processing stages that a graphics processing unit normally includes. Thus, for example, a graphics processing unit (and e.g. each graphics processing unit) of the one or more graphics processing units may include a primitive setup stage, a rasteriser and a renderer. In an embodiment the renderer may be in the form of or include a programmable fragment shader. A graphics processing unit (and e.g. each graphics processing unit) of the one or more graphics processing units may also contain any other suitable and desired processing stages that a graphics processing unit may contain such as a depth (or depth and stencil) tester(s), a blender, a write out unit etc. The programmable, execution (shading) stages (units) of the graphics processing pipeline can be implemented as desired and in any suitable manner, and can perform any desired and suitable shading, e.g. vertex shading, fragment shading, etc., functions, respectively and as appropriate. Each programmable processing (shader) stage (execution unit) may comprise any suitable programmable hardware element such as programmable processing circuitry. Each programmable processing (shader) stage (execution unit) may be provided as a separate circuit element to other programmable stages (shaders) (execution units) of a graphics processing unit or the programmable processing stages (execution units) may share some or all of their programmable processing circuitry (that is then differently programmed to serve as the desired programmable processing (shader) stage).

In an embodiment, the data (e.g. graphics) processing system and/or data (e.g. graphics) processing units comprise, and/or are in communication with, one or more memories and/or memory devices that store the (e.g. graphics) data described herein, and/or that store software for performing the processes described herein. The data (e.g. graphics) processing system and/or data (e.g. graphics) processing units may also be in communication with a host microprocessor, and/or with a display for displaying images based on the data generated by the data (e.g. graphics) processing system and/or data (e.g. graphics) processing units.

Embodiments may be carried out by any kind of data (e.g. graphics) processing system. However, in an embodiment, the data processing system is a tile-based (tiling) graphics processing system. In this case, a graphics processing unit (and e.g. each graphics processing unit) may also each comprise a tile buffer for storing tile sample values and/or a write out unit that operates to write the data in the tile buffer (e.g. once the data in the tile buffer is complete) out to external (main) memory (e.g. to a frame buffer).

In an embodiment, the various functions of the technology described herein may be carried out on a single data (e.g. graphics) processing platform that generates and outputs the output data that is, e.g., written to a frame buffer for a display device.

The technology described herein can be implemented in any suitable system, such as a suitably configured microprocessor based system. In some embodiments, the technology described herein is implemented in computer and/or micro-processor based system.

The technology described herein can be used for all forms of output that a data (e.g. graphics) processing system may output. Thus, it may be used when generating frames for display, render-to-texture outputs, etc. Although the technology described herein has been described above with particular reference to the operation of the graphics processing system to produce, e.g., frames for display, the data (e.g. graphics) processing system and the technology described herein can equally be used where the data (e.g. graphics) processing system is to be used to provide other processing and operations and outputs, for example that may not have or may not relate to a display or images. For example, the technology described herein can equally be used for non-graphics use cases such as ADAS (Advanced Driver Assistance Systems) which may not have a display and which may deal with input data (e.g. sensor data, such as radar data) and/or output data (e.g. vehicle control data) which isn't related to images. In general, the technology described herein can be used for any desired data (e.g. graphics) processing operations, such as GPGPU (general purpose GPU) operations.

The various functions of the technology described herein can be carried out in any desired and suitable manner. For example, the functions of the technology described herein can be implemented in hardware or software, as desired. Thus, for example, the various functional elements, stages and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program comprising computer software code for performing the methods herein described when the program is run on a data processor, and a computer program comprising code adapted to perform all the steps of a method or of the methods herein described when the program is run on a data (e.g. graphics) processing system. The data (e.g. graphics) processing system may be a microprocessor, a programmable FPGA (Field Programmable Gate Array), etc.

The technology described herein also extends to a computer software carrier comprising such software which when used to operate a data (e.g. graphics) processing system, or other system comprising a data processor, causes in conjunction with said data processor, said processing system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

As discussed above, the technology described herein relates to a data processing system comprising one or more data processing units, a configurable interconnect and control circuitry. The control circuitry allocates a set of one or more of the data processing units to a virtual machine and configures the configurable interconnect so as route one or more data processing tasks from the virtual machine to the one or more data processing units allocated for use by that virtual machine. This can provide a highly flexible and adaptable data processing system for carrying out the data processing tasks of a virtual machine, with the particular allocation of data processing units being substantially transparent to the virtual machine.

A number of embodiments of the technology described herein will now be described in the context of graphics processing. However, as discussed above, the technology described herein is also applicable to other forms of data processing tasks that can be performed using data processing units.

FIG. 1 shows an overall host data processing system 100 which includes a host data processing unit in the form of a central processing unit (CPU) 102. The CPU 102 runs one or more virtual machines that require data processing tasks to be carried out by a graphics data processing unit. The data processing system 100 further comprises a system interconnect 104 that connects the CPU 102 to a set of peripherals 106. In this embodiment, the set of peripherals 106 comprises a display for a main instrument console, components for a navigation/entertainment system, and input/output devices for an Advanced Driver Assistance System (ADAS). However, in other embodiments, other forms of peripherals can be used as desired.

The data processing system 100 further comprises a graphics data processing system 107. In this embodiment, the graphics processing system 107 comprises four connectable graphics processing units (GPUs) 108A-108D that can communicate with each other when linked. As will be discussed further below, the GPUs 108A-108D can be operated in various modes, namely either as "standalone" GPUs, or as one or more linked sets of a master and one or more slave GPUs. Although FIG. 1 shows four linked GPUs, in other embodiments, any number of GPUs can be used as desired.

The graphics processing system 107 further comprises a configurable interconnect 110 that maps addresses used by the one or more virtual machines running on the CPU 102 to graphics processing unit addresses for the GPUs 108A-108D. The graphics processing system 107 further comprises control circuitry in the form of a partition controller 112 that can allocate a set of one or more of the GPUs 108A-108D to a virtual machine and that can configure the configurable interconnect 110 accordingly so as to route data processing tasks from that virtual machine to the GPUs allocated to that virtual machine.

In use of this system, respective applications, such as a main instrument console application, a navigation/entertainment application and/or an ADAS application, etc., executing as respective virtual machines running on the CPU 102 may require data (e.g. graphics or non-graphics) processing operations to be performed by the graphics processing system 107. To do this, the virtual machine in question will generate calls that are interpreted by a driver for the graphics processing system 107 that is running on the CPU 102 to generate appropriate commands to the graphics processing system 107 to generate the data output required by the virtual machine. The driver will then send (e.g. commands and data for) the relevant data processing tasks to the graphics processing system 107 for processing by the graphics processing system 107 to generate the desired output (e.g. frame to be displayed or control data for (e.g. assisting) vehicle control). The data processing tasks of the virtual machine are then routed by the configurable interconnect 110 to the graphics processing units allocated to that virtual machine.

As shown in FIG. 1, the GPUs 108A-108D of the graphics processing system 107 are able to be linked to each other. This allows a GPU to optionally be linked up with the other GPUs to work cooperatively on a given task. The task routing and GPU link mechanism is implemented in hardware and is substantially transparent to the virtual machine running on the CPU 102, such that the GPUs 108A-108D can appear as the same single GPU to the virtual machine, regardless of the particular GPU configuration being used. This allows the graphics processing system 107 to be used in many different situations, either with separate GPUs for respective virtual machines, or with plural GPUs linked to execute functions with higher performance for a single virtual machine.

In the present embodiment, the first GPU 108A can operate in a standalone mode or a master mode, the second and third GPUs 108B, 108C can operate in a standalone mode, a master mode or a slave mode, and the fourth GPU 108D can operate in a standalone mode or a slave mode. In standalone mode, a GPU operates independently under direct control from the CPU 102. In master mode, the GPU controls one or more other GPUs operating in slave mode, and provides the software interface (the virtual machine interface) for the linked set of GPUs. In slave mode, the GPU operates under control of a master GPU.

The data outputs of the data processing operations performed by the GPUs 108A-108D can then be written to external memory 116 via a memory interconnect 114 and/or can then be output to the set of peripherals 106, for example for display or for (e.g. assisting) vehicle control, via the memory interconnect 114 and the system interconnect 104.

Figure 2:
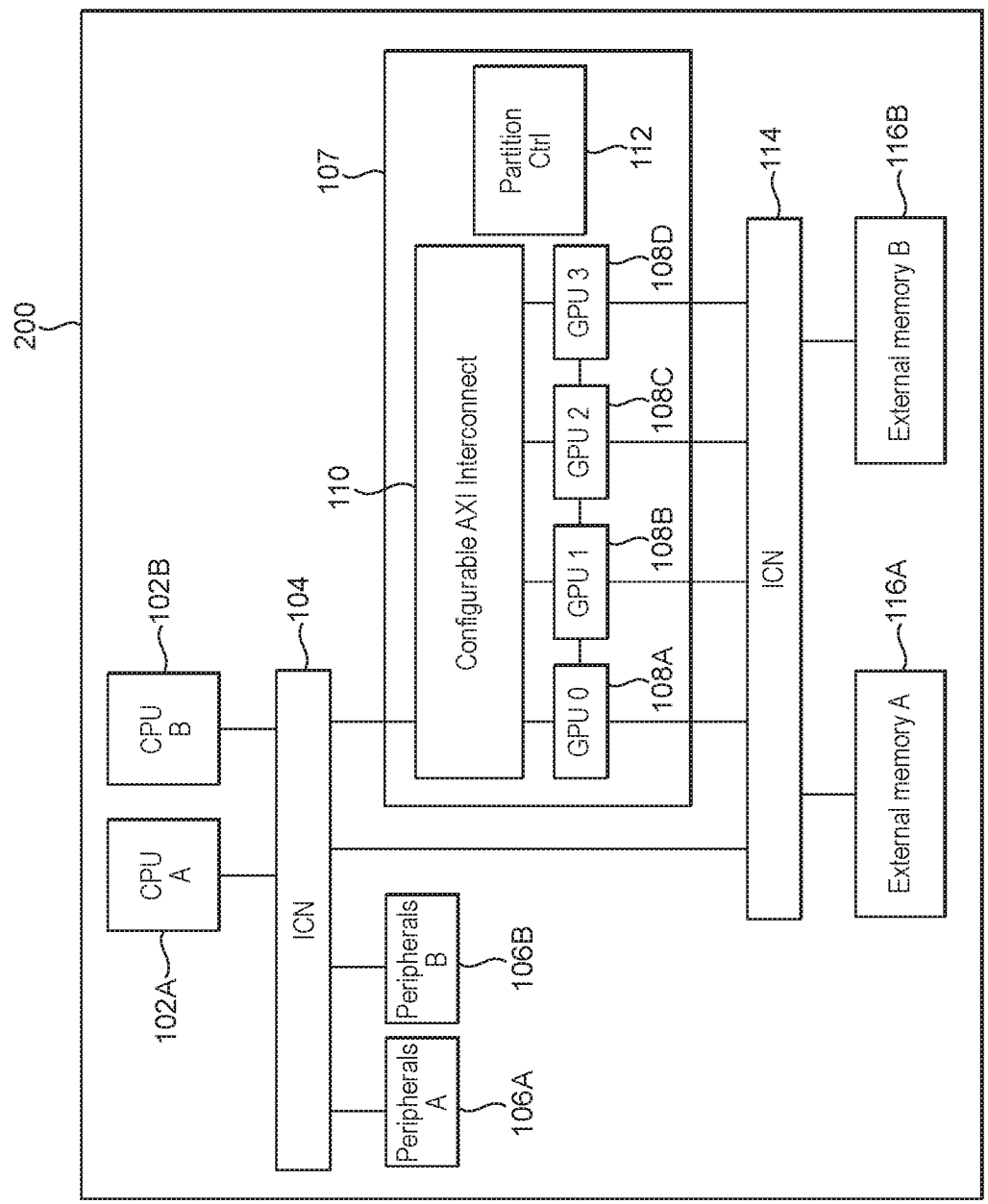
FIG. 2 shows schematically another host data processing system comprising a graphics processing system according to an embodiment of the technology described herein.

FIG. 2 shows an alternative embodiment of a host data processing system 200 to that which is shown in FIG. 1. In this embodiment, rather than having a single CPU 102, the host data processing system 200 comprises a first CPU 102A and a second CPU 102B. In this embodiment, the first CPU 102A runs virtual machines that belong to a first domain (domain A) and the second CPU 102B runs virtual machines that belong to a second domain (domain B). In this embodiment, the first domain is reserved for virtual machines that require non safety critical data processing tasks to be performed, such as virtual machines that execute navigation/entertainment applications, whereas the second domain is reserved for virtual machines that require safety critical data processing tasks to be performed, such as virtual machines that execute main instrument console applications, ADAS applications, etc. The separation of the CPUs in this embodiment can help to prevent non safety critical data processing tasks from interfering undesirably with safety critical data processing tasks.

Also, rather than having a single set of peripherals 106, the host data processing system 200 comprises a first set of peripherals 106A and a second set of peripherals 106B. The first set of peripherals 106A are accessed by the virtual machines that belong to the first domain (domain A) and second set of peripherals 106B are accessed by the virtual machines that belong to the second domain (domain B). In this embodiment, the first set of peripherals 106A comprises components of a navigation/entertainment system (e.g. a display screen, etc.) and the second set of peripherals 106B comprises components of a main instrument console system (e.g. a console display screen) and an ADAS (e.g. displays, sensors, controllers, etc., for (e.g. assisting) vehicle control). Again, the separation of the peripherals in this embodiment can help to prevent non safety critical data processing tasks from interfering undesirably with safety critical data processing tasks.

In this embodiment, the configurable interconnect 110 is also configured by the partition controller 112 to map addresses used by virtual machines in the first domain to certain ones of the GPUs only and to map addresses used by virtual machines in the second domain to certain other ones of the GPUs. This configuration of the configurable interconnect 110 may be done as the graphics processing system 107 is powered or booted up and the configurable interconnect 110 may not be reconfigured with regard to the domains in use. However, as will be discussed in more detail below, the configurable interconnect 110 may still be reconfigurable in use so as to reallocate GPUs to virtual machines within a domain.

Finally, rather than having a single external memory 116, the host data processing system 200 comprises a first external memory 116A and a second external memory 116B. The first external memory 116A stores data to be used in and generated by the data processing tasks performed for the virtual machines that belong to the first domain (domain A) and the second external memory 116B stores data to be used in and generated by the data processing tasks performed for the virtual machines that belong to the second domain (domain B). Again, the separation of the external memories in this embodiment can help to prevent non safety critical data processing tasks from interfering undesirably with safety critical data processing tasks.

Figure 3:
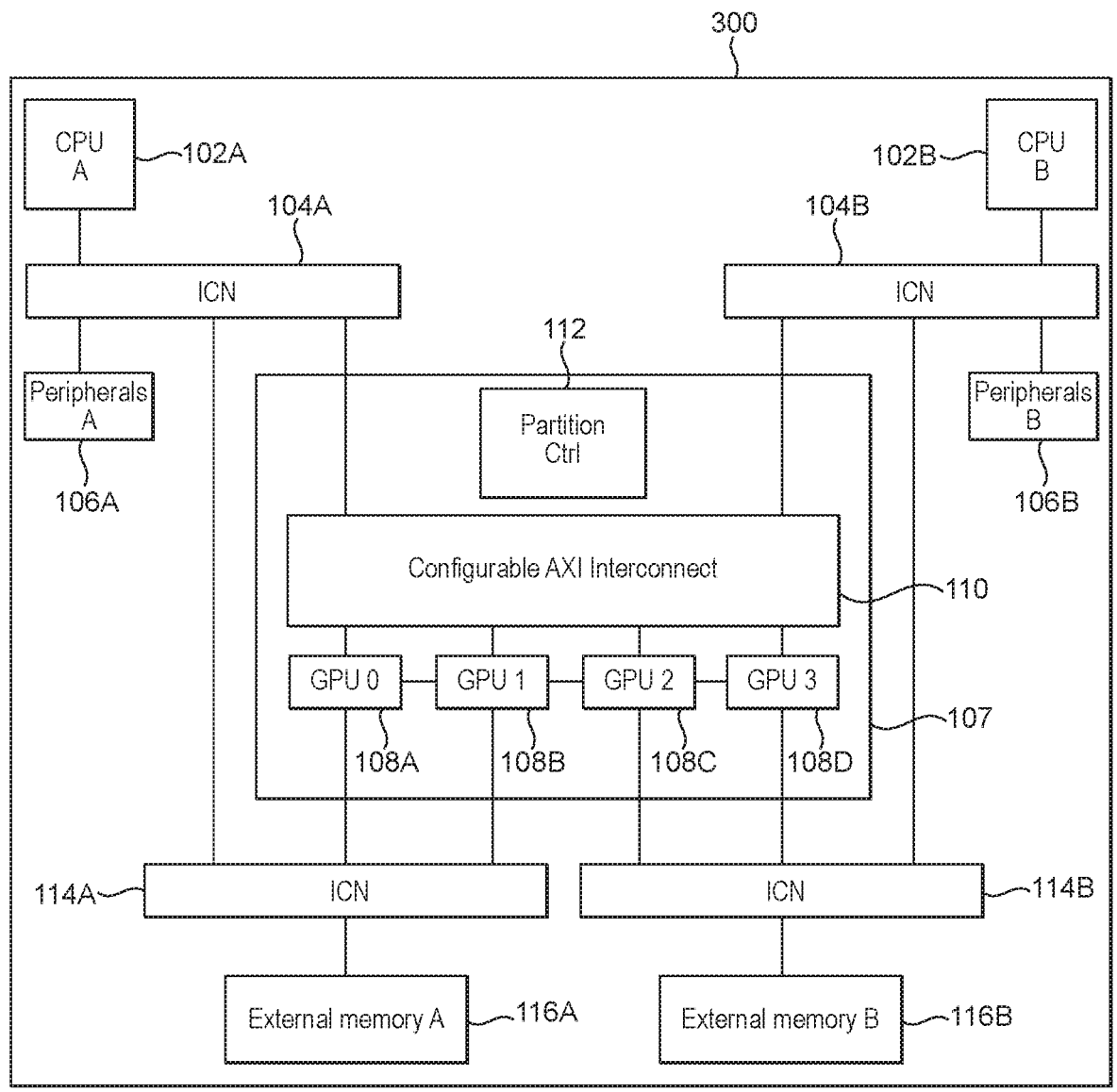
FIG. 3 shows schematically yet another host data processing system comprising a graphics processing system according to an embodiment of the technology described herein.

FIG. 3 shows another alternative embodiment of a host data processing system 300 to that which is shown in FIG. 2. In this embodiment, rather than having a single system interconnect 104, the host data processing system 300 comprises a first system interconnect 104A and a second system interconnect 104B. In this embodiment, the first system interconnect 104A is used by the first CPU 102A that runs virtual machines that belong to the first domain (domain A) and the second system interconnect 104B is used by the second CPU 102B by virtual machines that belong to the second domain (domain B).

Also, the graphics processing system 107 is configured such that the first and second GPUs 108A and 108B can only be used by virtual machines that belong to the first domain (domain A) and such that the third and fourth GPUs 108C and 108D can only be used by virtual machines that belong to the second domain (domain B), i.e. the connection between the second GPU 108B and third GPU 108C is disabled. This disabling of the connection may be done as the graphics processing system 107 is powered or booted up and may not be re-enabled in use.

In this embodiment, the configurable interconnect 110 is also configured by the partition controller 112 to map addresses used by virtual machines in the first domain to the first and second GPUs 108A and 108B only and to map addresses used by virtual machines in the second domain to the third and fourth GPUs 108C and 108D only. In this embodiment, this configuration of the configurable interconnect 110 may be done each time the graphics processing system 107 is powered or booted up and the configurable interconnect 110 may not be reconfigured with regard to the domains in use. However, as will be discussed in more detail below, the configurable interconnect 110 may still be reconfigurable in use so as to reallocate graphics processing units to virtual machines within a domain.

Finally, rather than having a single memory interconnect 114, the host data processing system 300 comprises a first memory interconnect 114A and a second memory interconnect 114B. In this embodiment, the first memory interconnect 114A is used by the first CPU 102A that runs virtual machines that belong to the first domain (domain A) and the second memory interconnect 114B is used by the second CPU 102B that runs virtual machines that belong to the second domain (domain B). The first and second GPUs 108A and 108B are accordingly connected to the first memory interconnect 114A and the third and fourth GPUs 108C and 108D are accordingly connected to the second memory interconnect 114B.

The further separation of the interconnects and GPUs in this embodiment can further help to prevent non safety critical data processing tasks from interfering undesirably with safety critical data processing tasks.

FIGS. 1-3 accordingly show an overview of various host data processing systems that comprise a graphics processing system according to embodiments of the technology described herein. However, it should be noted that FIGS. 1-3 are only schematic and that various components and connections have been omitted from those Figures for the sake of clarity.

Figure 4:
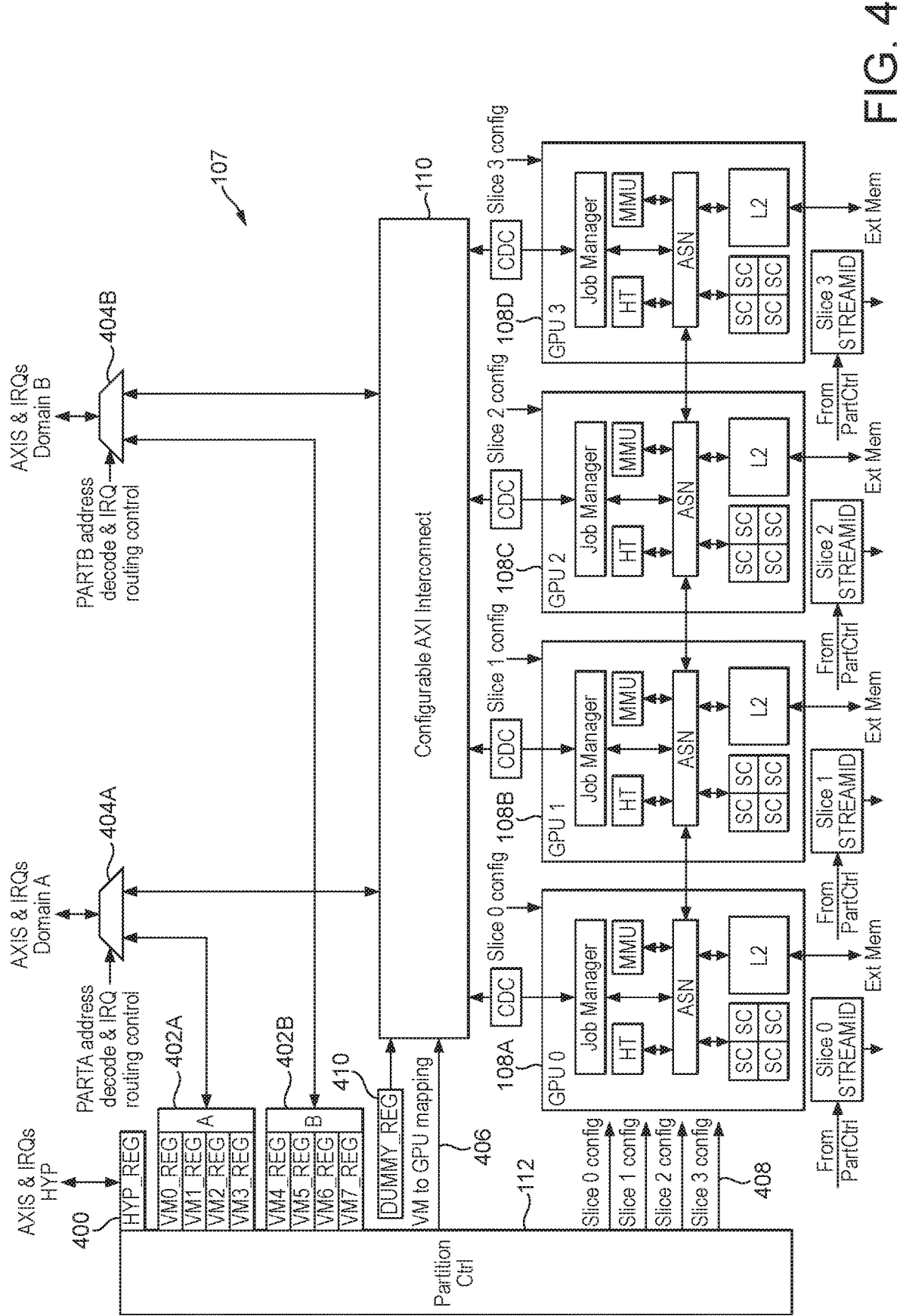
FIG. 4 shows schematically and in more detail components of a graphics processing system according to an embodiment of the technology described herein.

FIG. 4 shows in more detail the components of a graphics processing system 107 according to embodiments of the technology described herein.

As is shown in FIG. 4, in this embodiment, the partition controller 112 comprises a set of control registers 400 which can be used to configure the operation of the partition controller 112. These control registers 400 may be accessed by a hypervisor for the virtual machines, but not by the virtual machines themselves.

The partition controller 112 also comprises a first group of plural sets of communication registers 402A for communicating with respective virtual machines that belong to the first domain (domain A) and a second group of plural sets of communication registers 402B for communicating with respective virtual machines that belong to the second domain (domain B). It should be noted here that the control registers 400 are separate from the communication registers 402A, 402B for the virtual machines. This can prevent the virtual machines from configuring the partition controller 112.

It should also be noted here that, in this embodiment, the first set of communication registers 402A is separate from the second set of communication registers 402B. This can further help to prevent non safety critical data processing tasks of the first domain from interfering undesirably with safety critical data processing tasks of the second domain. However, in other embodiments (e.g. that which is shown in FIG. 1) a single domain may be used, and thus a single set of communication registers for that domain may be used.

In this embodiment, each set of communication registers corresponding to a virtual machine comprises the following registers:

| Name | Description |
|---|---|
| PC_TO_VMn | PC to VMn message |
| VMn_TO_PC | VMn to PC message |
| VMn_TO_PC_ACK | VMn to PC message acknowledge |
| VMn_TO_PC_MASK | VMn to PC message interrupt mask |

Where "PC" refers to the partition controller 112 and "VMn" refers to the nth virtual machine. In this embodiment, each domain can comprise up to four virtual machines (referred to herein as VM0-VM3 for the first domain and VM4-VM7 for the second domain). However, other numbers of virtual machines may be accommodated in other embodiments.

In this embodiment, each virtual machine is also provided with access to its own set of communication registers for communicating with the partition controller 112. In this embodiment, each set of communication registers for a particular virtual machine comprises the following registers:

| Name | Description |
| --- | --- |
| VM_TO_PC | VM to PC message |
| PC_TO_VM | PC to VM message |
| PC_TO_VM_ACK | PC to VM message acknowledge |
| PC_TO_VM_MASK | PC to VM message interrupt mask |

Where "PC" again refers to the partition controller 112 and "VM" refers to the virtual machine in question. Communication using the above communication registers is described in more detail below with reference to FIG. 10.

In this embodiment, the virtual machines that belong to the first domain can access the first set of communication registers 402A and the configurable interconnect 110 via a first switch 404A. The virtual machines that belong to the second domain can access the second set of communication registers 402B and the configurable interconnect 110 via a second switch 404B.

Thus, in this embodiment, there are separate inputs and switches used by the first and second domains. This can further help to prevent non safety critical data processing tasks of the first domain from interfering undesirably with safety critical data processing tasks of the second domain. However, in other embodiments (e.g. those shown in FIGS. 1 and 2) a single input and switch may be used. For example, in some embodiments (e.g. that which is shown in FIG. 1) a single domain may be used, and thus a single input and switch may be used. For another example, in some other embodiments (e.g. that which is shown in FIG. 2) two domains may be used but those two domains may share a single input and switch.

As is also shown in FIG. 4, the partition controller 112 is also connected to the configurable interconnect 110 via a mapping connection 406. The mapping connection 406 is used by the partition controller 112 to provide a mapping to the configurable interconnect 110 that maps addresses used by the virtual machines to GPU addresses for the GPUs 108A-108D. The configurable interconnect 110 can then use the mapping to route data processing tasks from a virtual machine to the appropriate GPU(s). Although not shown in FIG. 4, the configurable interconnect 110 can also help to ensure that the routing of the data processing tasks for the first and second domains is separated, such that the first and second domains cannot cause blocking of the configurable interconnect 110 for each other. One example of this separation will be explained in more detail below with reference to FIG. 6. Again, this can further help to prevent non safety critical data processing tasks of the first domain from interfering undesirably with safety critical data processing tasks of the second domain.

As is also shown in FIG. 4, the partition controller 112 is also connected to the GPUs 108A-108D via a set of configuration connections 408. The configuration connections 408 are used by the partition controller 112 to appropriately configure the GPUs 108A-108D to operate in standalone mode, as a master or as a slave. The configuration connections 408 are also used by the partition controller 112 to provide an identifier for a virtual machine and/or domain to the GPU(s) allocated to that virtual machine and/or domain. The identifier for a virtual machine and/or domain can then be output together with the output data generated by the GPU(s) allocated to that virtual machine and/or domain. The identifier can allow a virtual machine to locate and access the relevant output data generated by the GPU(s) allocated to that virtual machine, and thereby support memory isolation between virtual machines and/or domains.

As is also shown in FIG. 4, a set of dummy registers 410 is connected to the configurable interconnect 110. The dummy registers contain information for the respective GPUs that enables at least some driver initialisation for a virtual machine to take place even when that virtual machine is yet to be allocated a GPU. The driver can then enter a disabled state. Once a GPU is allocated to the virtual machine, the virtual machine can then access the register for that GPU.

FIG. 4 accordingly shows an overview of the graphics processing system according to embodiments of the technology described herein. However, it should again be noted that FIG. 4 is only schematic and that various components and connections have been omitted from that Figure for the sake of clarity.

Figure 5:
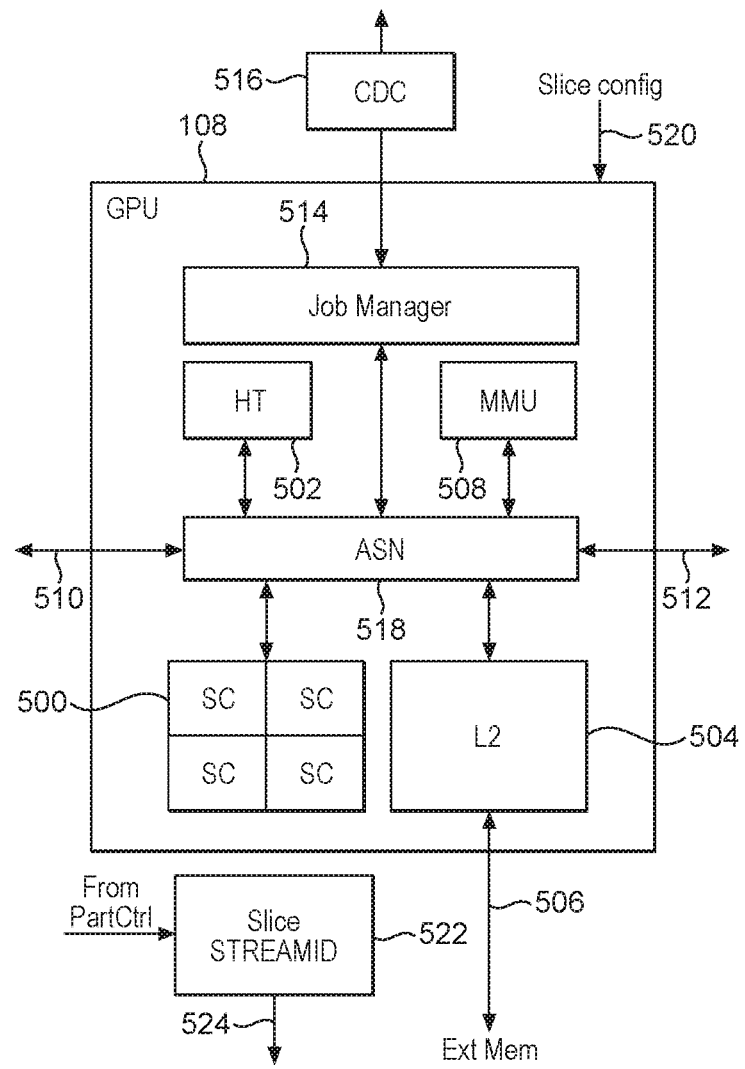
FIG. 5 shows schematically and in more detail components of a graphics processing unit of a graphics processing system according to an embodiment of the technology described herein.

FIG. 5 shows in more detail the arrangement and components of each GPU 108 of the graphics processing system 107 according to embodiments of the technology described herein.

As shown in FIG. 5, in this embodiment, each GPU 108 of the graphics processing system 107 comprises one or more execution units, such as programmable processing (shader) cores 500 (SC) and a hierarchical tiler 502 (HT). In this embodiment, each GPU 108 (and accordingly the graphics processing system 107) is tile-based. Different GPUs 108 may have different sets of execution units, and there are more possible types of execution units than those shown in FIG. 5.

Each GPU 108 also includes a level 2 cache 504 (L2) that inputs data to be used in the data processing tasks and outputs the resultant output data via a cache interface 506. The cache interface 506 is connected to the external system memory 116 via the memory interconnect 114. The GPUs 108 may also include a memory management unit (MMU) 508, but this may also or instead be located externally to the GPUs 108.

Each GPU 108 also includes one or more communication bridges comprising a slave bridge 510 for connecting to a master GPU (the master GPU may be connected directly, or through a daisy-chain of other slave GPUs), and/or a master bridge 512 for connecting to slave GPUs. The master bridge 512 is used in master mode to connect one or more slave GPUs (through daisy-chaining), and may also be used in slave mode to connect further daisy-chained slave GPUs.

In the present embodiment, the communication bridges 510, 512 are implemented to support an asynchronous interface between GPUs, as this allows easier physical implementation of the GPUs as the clock can then be independent when the GPUs are linked.

Each GPU also includes a job manager 514. This provides the software interface for the GPU 108, and thus receives via a task interface 516 tasks (commands and data) for a virtual machine from a driver running on the CPU 102 and divides a task given by the driver into subtasks and distributes the subtasks for execution to the various execution units (shader cores 500, tiler 502) of the GPU 108. Where a GPU 108 is able to operate as a master, the job manager 514 is configured to also be able to control execution units of linked slave GPUs. Correspondingly, for a GPU 108 that is able to operate as a slave, the job manager 514 is able to be disabled when the GPU 108 is operating in slave mode.

As shown in FIG. 5, the various functional units, etc., of each GPU 108 are connected to each other via an asynchronous communications interconnect 518 that carries various traffic such as memory transactions between execution units and the level 2 cache 504 (L2), subtask control traffic between the job manager 514 and execution units, and so on.

As shown in FIG. 5, the asynchronous interconnect 518 also connects to the respective slave and master bridges 510, 512 of the GPU 108 and includes appropriate switches (not shown) that can be activated to enable or disable communication across (via) the bridges 510, 512 to a connected GPU.

The different operating modes of the GPU (standalone, master and slave modes) are set (enabled and disabled) by configuring the routing of the asynchronous interconnect 518 appropriately. Thus, for example, when the GPU is to operate in standalone mode, the slave and master bridges 510, 512 are disabled to prevent communication via (across) the bridges. Correspondingly, when a GPU 108 is to act as a master, the master bridge 512 is enabled to allow communication with a connected GPU. Correspondingly, when a GPU 108 is to act as a slave, the slave bridge 510 is enabled to allow communication with a connected GPU.

In the present embodiments, the asynchronous interconnect 518 is reconfigured by the partition controller 112 through a configuration interface 520 of the GPU 108, and any routing configuration (or reconfiguration) only happens during reset of the GPU 108.

Each GPU 108 also has associated with it an identifier unit 522 that stores an identifier assigned by the partition controller 112 to the virtual machine and/or domain for that GPU 108. The identifier is provided by the partition controller 112 via an identifier interface 524 for the GPU 108. As discussed above, the GPU 108 can then output the identifier together with the output data from the L2 cache 504. The identifier can be used for memory access permission checking, e.g. a virtual machine and/or GPU from the first domain (domain A) may not be able to access data associated with the second domain (domain B) because it does not know the correct identifier for accessing that data.

FIG. 5 accordingly shows an overview of the graphics processing unit according to embodiments of the technology described herein. However, it should again be noted that FIG. 5 is only schematic and that various components and connections have been omitted from that Figure for the sake of clarity.

Figure 6:
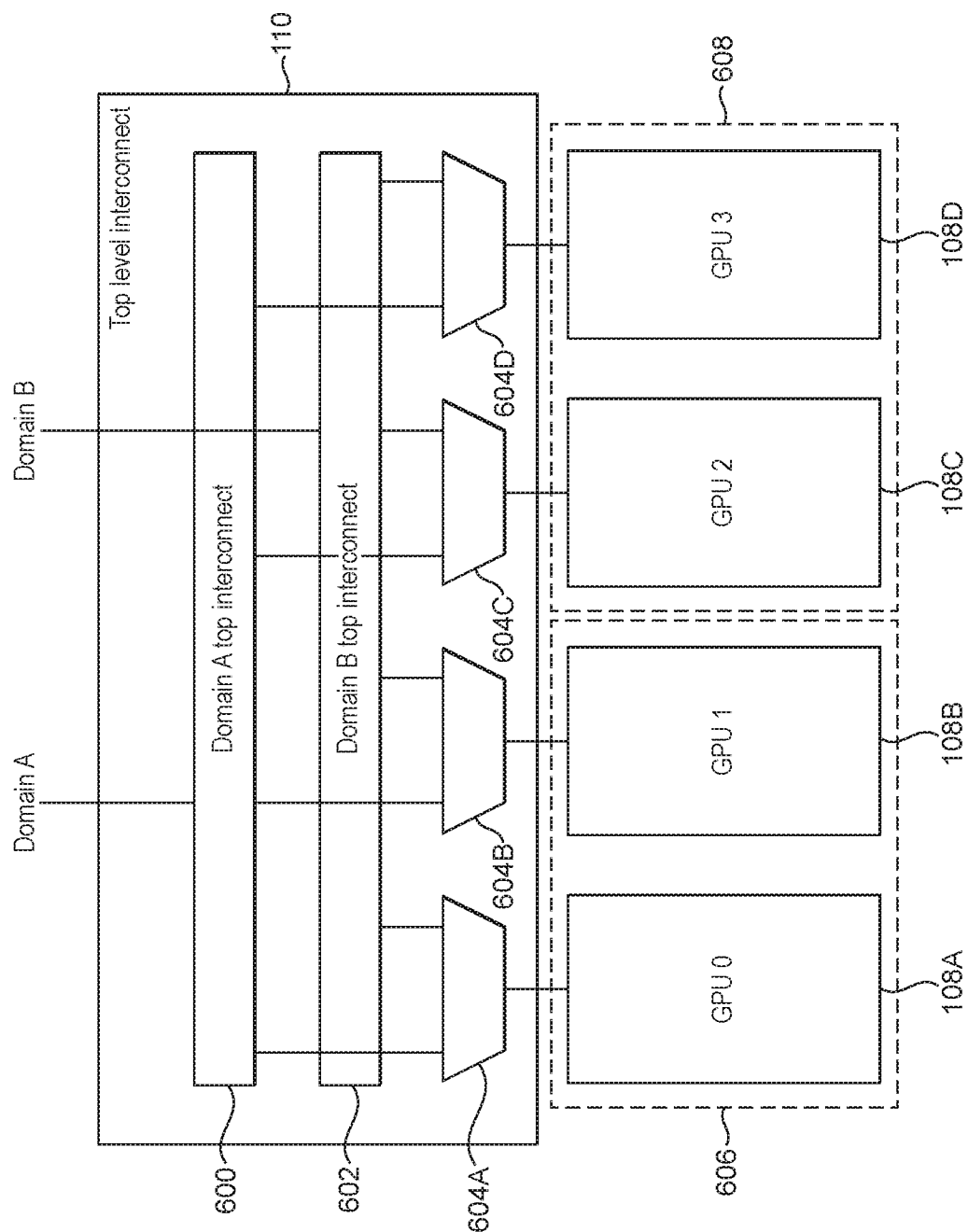
FIG. 6 shows schematically and in more detail components of a configurable interconnect of a graphics processing system according to an embodiment of the technology described herein.

FIG. 6 shows schematically and in more detail components of a configurable interconnect 110 of a graphics processing system 107, such as the graphics processing system shown in FIGS. 3 and 4.

As is shown in FIG. 6, the configurable interconnect 110 comprises a first sub-interconnect 600 for a first domain (domain A) and a second sub-interconnect 602 for a second domain (domain B). The configurable interconnect 110 also comprises a switch 604A-604D for each respective GPU 108A-108D. Each switch 604A-604D can selectively switch its GPU 108A-108D from receiving data from the first sub-interconnect 600 to receiving data from the second sub-interconnect 602 and vice versa.

In this embodiment, the first GPU 108A and second GPU 108B can be allocated by the partition controller 112 to virtual machines from the first domain 606. The first switch 604A and second switch 604B are accordingly set to connect the first GPU 108A and second GPU 108B to the first sub-interconnect 600. In this configuration, the first GPU 108A can either be operated in standalone mode or as a master, and the second GPU 108B can either be operated in standalone mode or as a slave.

Also, in this embodiment, the third GPU 108C and fourth GPU 108D can be allocated by the partition controller 112 to virtual machines from the second domain 608. The third switch 604C and fourth switch 604D are accordingly set to connect the third GPU 108C and fourth GPU 108D to the second sub-interconnect 602. In this configuration, the third GPU 108C can either be operated in standalone mode or as a master, and the fourth GPU 108D can either be operated in standalone mode or as a slave.

Thus, in this embodiment, the configurable interconnect 110 can help to ensure that the routing of the data processing tasks for the first and second domains is separated, such that the first and second domains cannot cause blocking of the configurable interconnect 110 for each other. As discussed above, this can help to prevent non safety critical data processing tasks of the first domain from interfering undesirably with safety critical data processing tasks of the second domain.

In this embodiment, the master bridge of the second GPU 108B and the slave bridge of the third GPU 108C are also disabled by the partition controller 112 to prevent communication between the domains 606, 608.

In this embodiment, the configuration of the switches 604A-604D and GPUs bridges 510, 512 with regard to the domains 606, 608 can only be set when the graphics processing system 107 is being powered or booted up and cannot be changed in use. This can help to prevent non safety critical data processing tasks of the first domain 606 from interfering undesirably with safety critical data processing tasks of the second domain 608.

Figure 7:
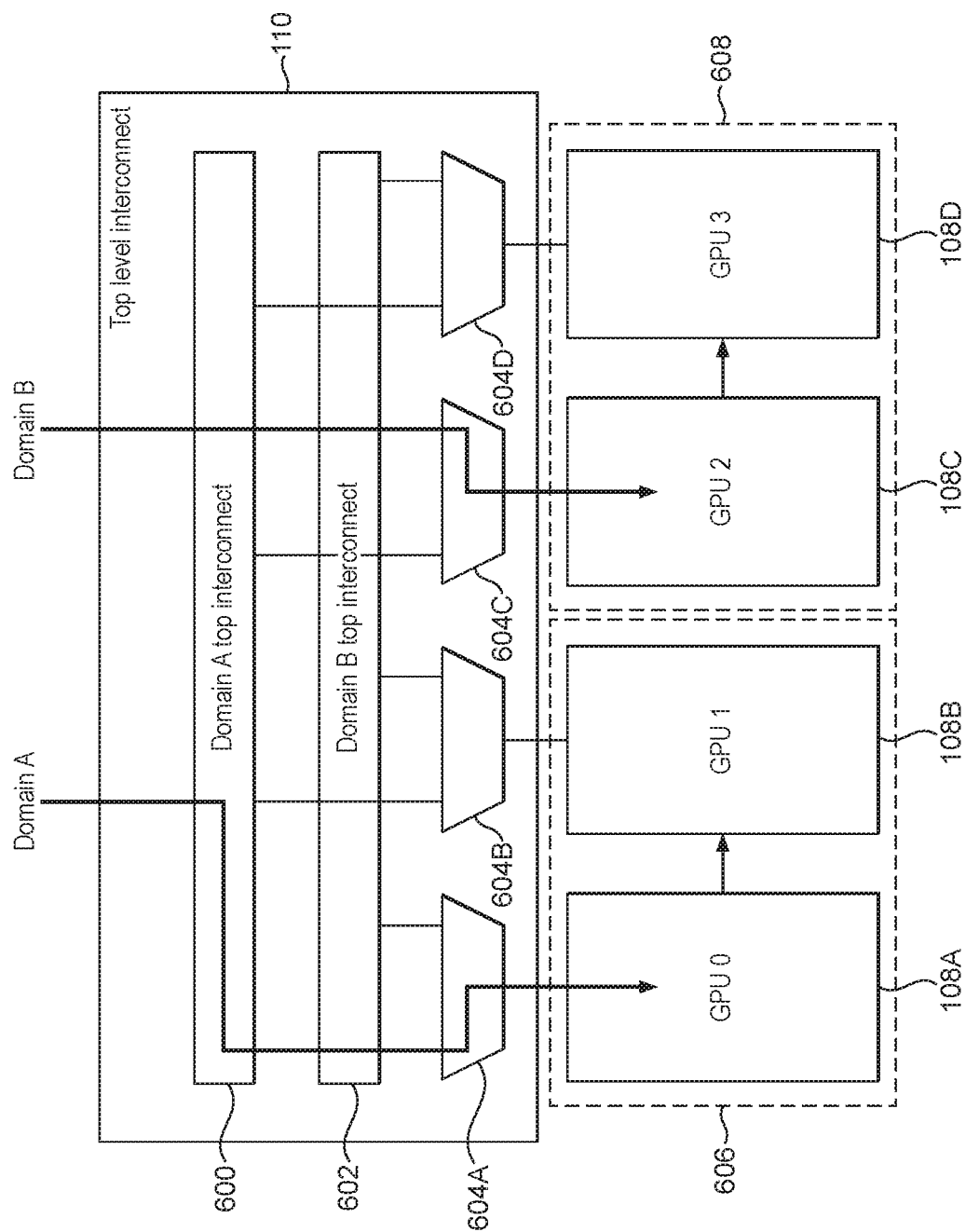
FIG. 7 shows a graphics processing system being operated in a first configuration according to an embodiment of the technology described herein.

FIG. 7 shows the graphics processing system 107 of FIG. 6 being operated in a first configuration. As shown in FIG. 7, the first GPU 108A is operating as a master and the second GPU 108B is operating as a slave for a virtual machine in the first domain 606. The first GPU 108A and second GPU 108B are accordingly connected via the master bridge of the first GPU 108A and the slave bridge of the second GPU 108B. The data processing tasks from the first virtual machine of the first domain 606 are also accordingly routed by the first sub-interconnect 600 and first switch 604A to the first GPU 108A. Thus, so far as the first virtual machine is concerned, it simply sees a single GPU for this purpose. Thus, in this embodiment, the two four shader core GPUs 108A, 108B operate as a single eight shader core GPU, with the first GPU 108A acting as a master controlling the execution units on the second GPU 108B acting as a slave. It would also be possible to remove some shader cores, e.g. the second GPU 108B could be implemented as having only three shader cores.

As is also shown in FIG. 7, the third GPU 108C is operating as a master and the fourth GPU 108D is operating as a slave for a second virtual machine in the second domain 608. The third GPU 108C and fourth GPU 108D are accordingly connected via the master bridge of the third GPU 108C and the slave bridge of the fourth GPU 108D. The data processing tasks from the second virtual machine of the second domain are also accordingly routed by the second sub-interconnect 602 and third switch 604C to the third GPU 108C. Thus, so far as the second virtual machine is concerned, it simply sees a single GPU for this purpose. Thus, in this embodiment, the two four shader core GPUs 108C, 108D also operate as a single eight shader core GPU, with the third GPU 108C acting as a master controlling the execution units on the fourth GPU 108D acting as a slave. Again, it would also be possible to remove some shader cores, e.g. the fourth GPU 108D could be implemented as having only three shader cores.

Figure 8:
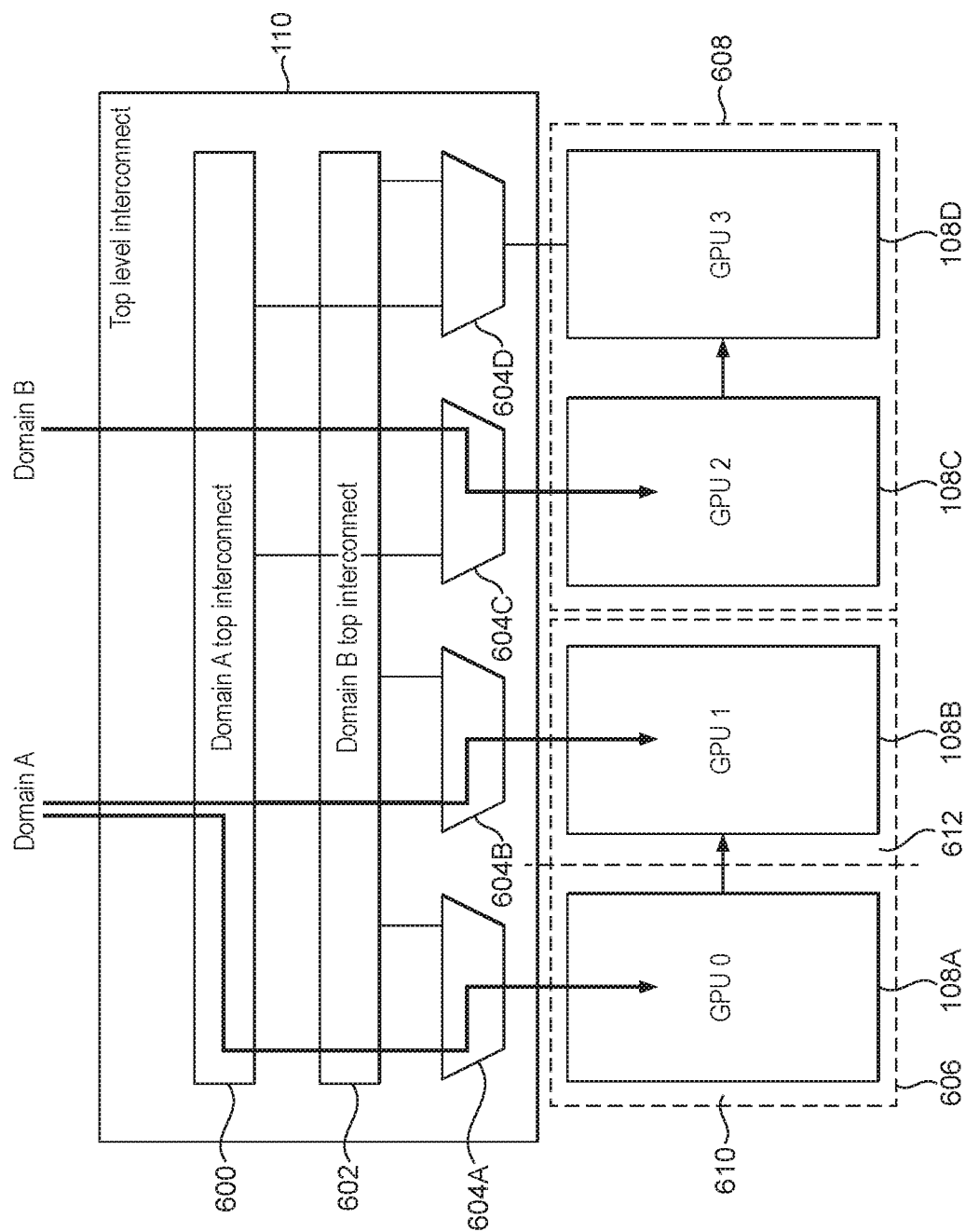
FIG. 8 shows a graphics processing system being operated in a second configuration according to an embodiment of the technology described herein.

FIG. 8 then shows the graphics processing system 107 of FIG. 6 being operated in a second configuration. In this embodiment, a third virtual machine of the first domain 606 has requested use of GPU resources and has been allocated the second GPU 108B. That second GPU 108B has accordingly been de-allocated from the first virtual machine and re-allocated to the third virtual machine to use for its data processing tasks. The process of allocating or reallocating GPUs to a virtual machine is described in more detail below with reference to FIG. 9.

Thus, as shown in FIG. 8, the first GPU 108A and second GPU 108B are operating in standalone mode for their respective virtual machines. The master bridge of the first GPU 108A and the slave bridge of the second GPU 108B are accordingly disabled by the partition controller 112. The data processing tasks from the first virtual machine of the first domain 606 are accordingly routed by the first sub-interconnect 600 and first switch 604A to the first GPU 108A. The data processing tasks from the third virtual machine of the first domain 606 are also accordingly routed by the first sub-interconnect 600 and second switch 604B to the second GPU 108B. Thus, the first domain 606 has been "partitioned" by the partition controller 112 into a first GPU partition 610 for the first virtual machine and a second GPU partition 612 for the third virtual machine.

As is also shown in FIG. 8, the third GPU 108C remains operating as a master and the fourth GPU 108D remains operating as a slave for the second virtual machine.

The process of the partition controller 112 allocating or reallocating GPUs to a virtual machine will now be described in more detail with reference to FIG. 9.

Figure 9:
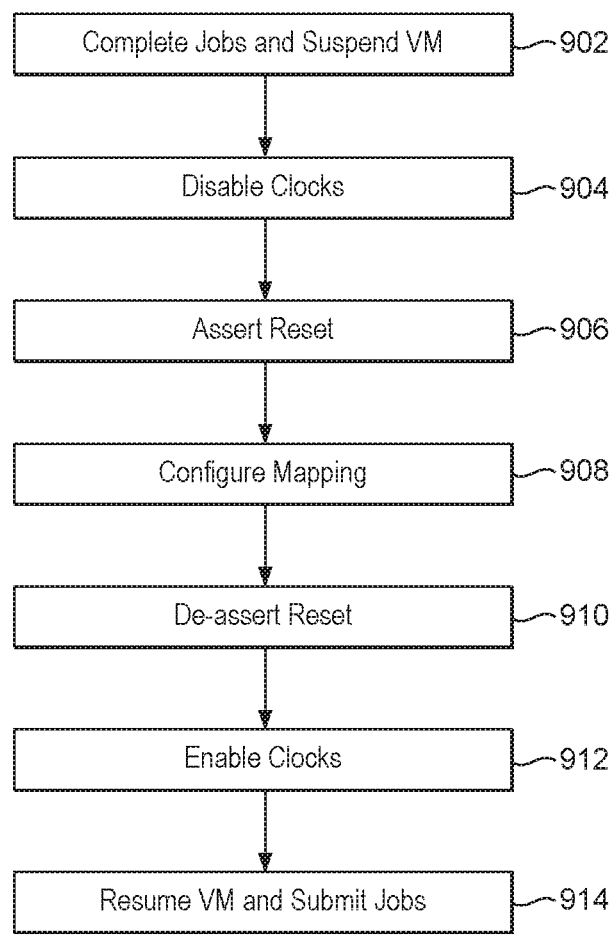
FIG. 9 shows a process for allocating one or more graphics processing units of a graphics processing system according to an embodiment of the technology described herein.

The process of FIG. 9 can be performed, for example, in response to a virtual machine making a request to the partition controller 112 to use the graphics processing system 107 and/or one or more of its GPUs, or in response to a virtual machine informing the partition controller 112 that it no longer needs to use the graphics processing system 107 and/or one or more of its GPUs.

Initially, as discussed above, a requesting virtual machine may have already been given access to a dummy register 410 so that at least some driver initialisation for that virtual machine can take place.

Then, in step 902, the partition controller 112 requests any virtual machines that will be affected by the new allocation of GPUs to complete any processing tasks (jobs) in progress and suspend further operation. For example, with reference to the embodiment of FIG. 7, the first virtual machine using the first and second GPUs 108A, 108B may be suspended, but the second virtual machine using the third and fourth GPUs 108C, 108D may not be suspended. As part of this step, the partition controller 112 performs a handshaking process with each affected virtual machine to ensure that each virtual machine has received the request. The handshaking process is described in more detail below with reference to FIG. 10.

Then, in step 904, the partition controller 112 disables the clock signals for the relevant GPUs. For example, with reference to the embodiment of FIG. 7, the clock signals for the first and second GPUs 108A, 108B may be disabled, but the clock signals for the third and fourth GPUs 108C, 108D may not be disabled. Then, in step 906, the partition controller 112 asserts a reset of the relevant GPUs. For example, with reference to the embodiment of FIG. 7, the first and second GPUs 108A, 108B may be reset, but the third and fourth GPUs 108C, 108D may not be reset.

Then, in step 908, the partition controller 112 determines and then configures the mapping of the configurable interconnect 110 so as to appropriately map the addresses used by the virtual machines in question to the addresses for the GPUs allocated to those virtual machines. For example, with reference to the embodiments of FIGS. 7 and 8, the addresses used by the first virtual machine may be mapped to the first GPU 108A only and the addresses used by the third virtual machine may be mapped to the second GPU 108B only. Thus, the partition controller 112 may reconfigure the first sub-interconnect 600 but not the second sub-interconnect 602.

As part of this step, the partition controller 112 also appropriately configures the master and slave bridges of the relevant GPUs. For example, with reference to the embodiments of FIGS. 7 and 8, the master bridge of the first GPU 108A and slave bridge of the second GPU 108B are disabled, and the job managers, tilers, MMUs, etc., of the first and second GPUs 108A, 108B are enabled for standalone mode.

Then, in step 910, the partition controller 112 de-asserts the reset of the relevant GPUs. For example, with reference to the embodiment of FIG. 8, the reset of the first and second GPUs 108A, 108B may be de-asserted. Then, in step 912, the partition controller 112 re-enables the clock signals for the relevant GPUs. For example, with reference to the embodiment of FIG. 8, the clock signals for the first and second GPUs 108A, 108B may be re-enabled.

Finally, in step 914, the partition controller 112 indicates to any virtual machines that were affected by the new allocation of GPUs that further operation can be resumed or started and that new tasks (jobs) can be submitted. For example, with reference to the embodiment of FIG. 8, the first virtual machine may be resumed and the third virtual machine may be started. Again, as part of this step, the partition controller 112 performs a handshaking process with each affected virtual machine to ensure that each GPU has received the indication. The handshaking process described with reference to FIG. 10 can again be used for this.

Figure 10:
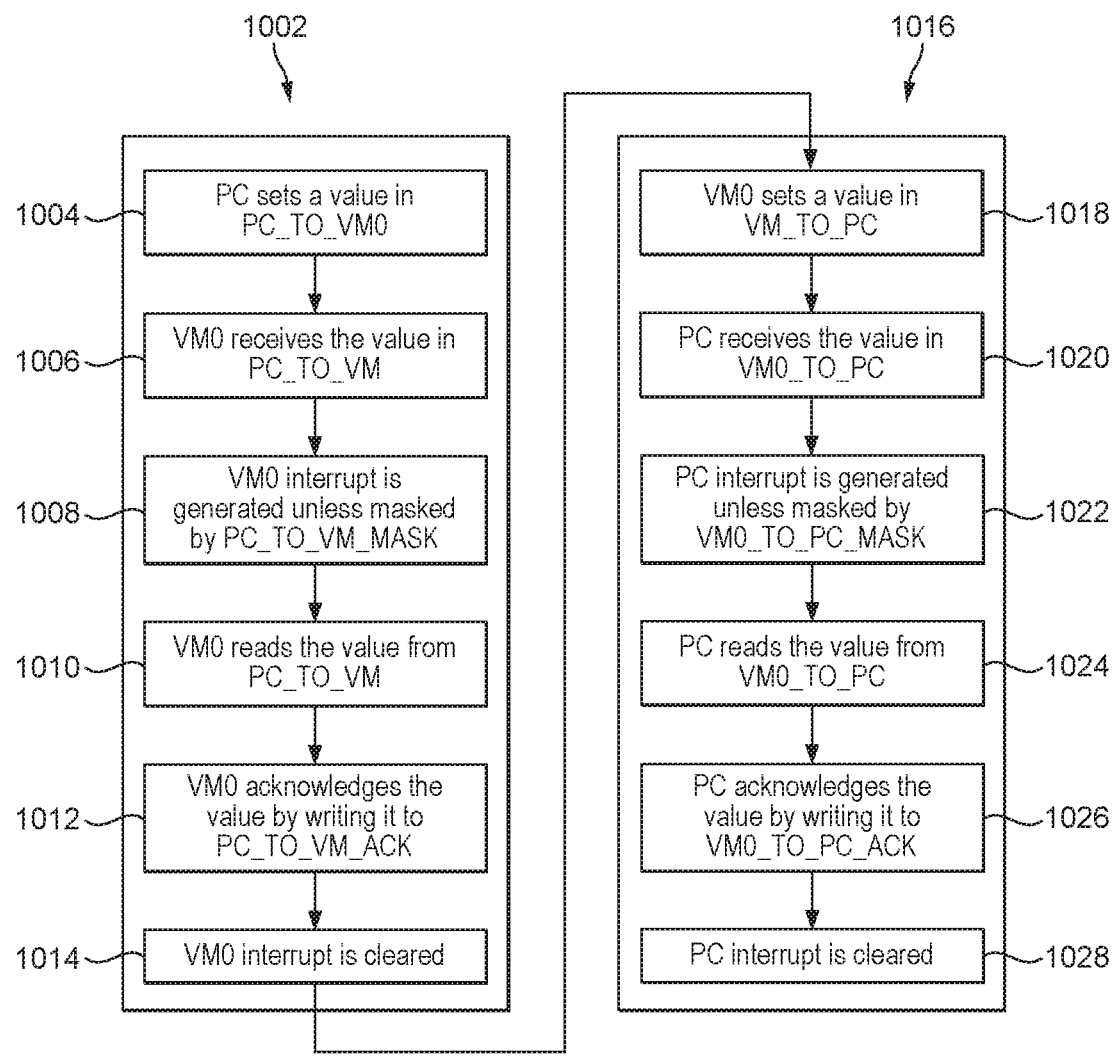
FIG. 10 shows a handshaking process between control circuitry of a graphics processing system and a virtual machine according to an embodiment of the technology described herein.

The handshaking process between the partition controller 112 and a virtual machine will now be described in more detail with reference to FIG. 10.

The first set of steps shown in box 1002 is initiated by the partition controller 112 (PC), for example in response to receiving a request from a virtual machine to use GPU resources or when data processing tasks can be resumed.

In the following example, a first virtual machine (VM0) is affected by one of its GPUs being reallocated to a second virtual machine. Thus, in step 1004, the partition controller 112 sets a value in its PC_TO_VM0 register, which is used to communicate with the first virtual machine. The value written may indicate a "suspend" request or "resume" indication, depending on the context.

Then, in step 1006, the first virtual machine (VM0) receives that value in its PC_TO_VM register. Then, in step 1008, an interrupt to the first virtual machine is generated, unless the interrupt is masked by a predefined value set in its PC_TO_VM_MASK register. The first virtual machine's PC_TO_VM_MASK register can accordingly be used to prevent or delay the partition controller 112 interrupting the first virtual machine and reallocating resources from the first virtual machine to another virtual machine.

Then, in step 1010, when the interrupt is not masked or no longer masked, the first virtual machine reads the value from its PC_TO_VM register. Then, in step 1012, the first virtual machine acknowledges the value by writing it to its PC_TO_VM_ACK register. Then, in step 1014 the first virtual machine's interrupt is cleared.

The second set of steps shown in box 1016 are then initiated by the first virtual machine. In step 1018, the first virtual machine sets a value in its VM_TO_PC register. The value written may again indicate a "suspend" request or "resume" indication, depending on the context.

Then, in step 1020, the partition controller 112 receives the value in its VM0_TO_PC register. Then, in step 1022, an interrupt to the partition controller 112 is generated, unless the interrupt is masked by a predefined value set in its VM0_TO_PC_MASK register. The partition controller's VM0_TO_PC_MASK register can accordingly be used to prevent or delay the first virtual machine from interrupting the partition controller 112.

Then, in step 1024, when the interrupt is not masked or no longer masked, the partition controller 112 reads the value from its VM0_TO_PC register. Then, in step 1026, the partition controller 112 acknowledges the value by writing it to its VM0_TO_PC_ACK register. Then, in step 1028 the partition controller's interrupt is cleared.

The above handshaking process accordingly informs the partition controller 112 that the virtual machine has received and accepted the request or indication in question, and then informs the virtual machine that the partition controller 112 is aware that the virtual machine has received and accepted the request or indication in question.

As will be appreciated from the above, embodiments of the technology described herein can provide a highly flexible and adaptable data processing system for carrying out the data processing tasks of a virtual machine, with a particular allocation of one or more data processing units being substantially transparent to the virtual machine. This is achieved in embodiments of the technology described herein by control circuitry configuring a configurable interconnect so as route one or more data processing tasks from the virtual machine to the one or more data processing units allocated for use by that virtual machine.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A data processing system comprising:
   one or more data processing units;
   a configurable interconnect that is operable to route data processing tasks from virtual machines to the one or more data processing units; and
   control circuitry operable to allocate a set of one or more of the data processing units to a virtual machine for use by that virtual machine, wherein when allocating the set of one or more data processing units to the virtual machine, the control circuitry is operable to configure the configurable interconnect to route one or more data processing tasks from the virtual machine to the one or more data processing units allocated for use by that virtual machine.

2. A system as claimed in claim 1, wherein:
   the virtual machine is one of plural virtual machines, the control circuitry being operable to allocate a set of one or more of the data processing units to at least one other virtual machine of the plural virtual machines for use by that at least one other virtual machine, wherein allocating the set of one or more data processing units to that at least one other virtual machine comprises the control circuitry configuring the configurable interconnect to route data processing tasks for that at least one other virtual machine to the one or more data processing units allocated to that at least one other virtual machine.

3. A system as claimed in claim 1, wherein:
   the control circuitry is operable to subsequently allocate a further set of one or more data processing units to a virtual machine, wherein subsequently allocating the further set of one or more data processing units to a virtual machine comprises the control circuitry configuring the configurable interconnect to route data processing tasks for that virtual machine to the one or more data processing units subsequently allocated to that virtual machine.

4. A system as claimed in claim 3, wherein:
   when subsequently allocating a further set of one or more data processing units to a virtual machine, the control circuitry is operable to suspend the data processing tasks of that virtual machine prior to allocating the further set of one or more data processing units to that virtual machine.

5. A system as claimed in claim 4, wherein:
   when suspending the data processing tasks of a virtual machine, the control circuitry is operable to perform a handshaking process between the control circuitry and that virtual machine.

6. A system as claimed in claim 1, wherein:
   the control circuitry is operable to provide a virtual machine that does not have one or more of the data processing units allocated to it with access to one or more dummy registers for one or more of the data processing units, wherein the one or more dummy registers contain information relating to the one or more data processing units that enables at least some initialisation to take place for the virtual machine.

7. A system as claimed in claim 1, wherein:
   the system comprises a plurality of data processing units, wherein each data processing unit of the plurality of data processing units is connectable to at least one other data processing unit of the plurality of data processing units via a communications bridge that can allow communication between the connected data processing units, wherein at least one of the data processing units is operable to act as a master data processing unit and at least one of the data processing units is operable to act as a slave data processing unit.

8. A system as claimed in claim 1, wherein:
   the control circuitry is operable to separate plural virtual machines or plural data processing units into a first domain comprising a first group of one or more of the virtual machines or data processing units and a second domain comprising a second group of one or more of the virtual machines or data processing units, wherein the first domain is reserved for a first set of one or more virtual machines that perform a first type of data processing task and the second domain is reserved for a second set of one or more virtual machines that perform a second type of data processing task.

9. A system as claimed in claim 1, wherein:
   at least one of the data processing units is configured to use an identifier to identify or indicate data used or generated by that data processing unit.

10. A method of operating a data processing system, the system comprising one or more data processing units and a configurable interconnect for routing data processing tasks from virtual machines to the one or more data processing units, the method comprising:

allocating, by control circuitry of the system, a set of one or more of the data processing units to a virtual machine for use by that virtual machine, wherein allocating the set of one or more data processing units to the virtual machine comprises the control circuitry configuring the configurable interconnect to route one or more data processing tasks from the virtual machine to the one or more data processing units allocated for use by that virtual machine.

11. A method as claimed in claim 10, wherein:
the virtual machine is one of plural virtual machines, the control circuitry allocating a set of one or more of the data processing units to at least one other virtual machine of the plural virtual machines for use by that at least one other virtual machine, wherein allocating the set of one or more data processing units to that at least one other virtual machine comprises the control circuitry configuring the configurable interconnect to route data processing tasks for that at least one other virtual machine to the one or more data processing units allocated to that at least one other virtual machine.

12. A method as claimed in claim 10, further comprising:
the control circuitry subsequently allocating a further set of one or more data processing units to a virtual machine, wherein subsequently allocating the further set of one or more data processing units to a virtual machine comprises the control circuitry configuring the configurable interconnect to route data processing tasks for that virtual machine to the one or more data processing units subsequently allocated to that virtual machine.

13. A method as claimed in claim 12, wherein:
subsequently allocating a further set of one or more data processing units to a virtual machine comprises the control circuitry suspending the data processing tasks of that virtual machine prior to allocating the further set of one or more data processing units to that virtual machine.

14. A method as claimed in claim 13, wherein:
suspending the data processing tasks of a virtual machine comprise the control circuitry performing a handshaking process between the control circuitry and that virtual machine.

15. A method as claimed in claim 10, further comprising:
the control circuitry providing a virtual machine that does not have one or more of the data processing units allocated to it with access to one or more dummy registers for one or more of the data processing units, wherein the one or more dummy registers contain information relating to the one or more data processing units that enables at least some initialisation to take place for the virtual machine.

16. A method as claimed in claim 10, wherein:
the system comprises a plurality of data processing units, wherein each data processing unit of the plurality of data processing units is connectable to at least one other data processing unit of the plurality of data processing units via a communications bridge that can allow communication between the connected data processing units, the method further comprising at least one of the data processing units acting as a master data processing unit and at least one of the data processing units acting as a slave data processing unit.

17. A method as claimed in claim 10, further comprising:
the control circuitry separating plural virtual machines or plural data processing units into a first domain comprising a first group of one or more of the virtual machines or data processing units and a second domain comprising a second group of one or more of the virtual machines or data processing units, wherein the first domain is reserved for a first set of one or more virtual machines that perform a first type of data processing task and the second domain is reserved for a second set of one or more virtual machines that perform a second type of data processing task.

18. A method as claimed in claim 10, further comprising:
at least one of the data processing units using an identifier to identify or indicate data used or generated by that data processing unit.

19. A non-transitory computer readable storage medium storing computer software code which, when executing on one or more processors of a data processing system that comprises one or more data processing units and a configurable interconnect for routing data processing tasks from virtual machines to the one or more data processing units, performs a method comprising:
allocating, by control circuitry of the system, a set of one or more of the data processing units to a virtual machine for use by that virtual machine, wherein allocating the set of one or more data processing units to the virtual machine comprises the control circuitry configuring the configurable interconnect to route one or more data processing tasks from the virtual machine to the one or more data processing units allocated for use by that virtual machine.

* * * * *